United States Patent [19]

Okamoto et al.

[11] Patent Number: 5,064,999

[45] Date of Patent: Nov. 12, 1991

[54] ADVANCE TRANSACTION PROCESSING METHOD

[75] Inventors: Ryuichi Okamoto; Masato Nishiguchi, both of Owariasahi; Hiroshi Kasugai, Ichinomiya; Seishi Tamamoto, Seto, all of Japan

[73] Assignees: Hitachi, Ltd., Tokyo; Chubu Hitachi Electric Co., Ltd., Aichi, both of Japan

[21] Appl. No.: 570,526

[22] Filed: Aug. 21, 1990

[30] Foreign Application Priority Data

Aug. 21, 1989 [JP] Japan .................................. 1-215710

[51] Int. Cl.$^5$ .............................................. G06F 15/30

[52] U.S. Cl. .................................... 235/379; 235/380; 902/8

[58] Field of Search ..................... 235/379, 380; 902/5, 902/8; 364/405, 408

[56] References Cited

U.S. PATENT DOCUMENTS 4,630,200 12/1986 Ohmae et al. ........................ 364/405
4,635,053 1/1987 Banks et al. ............................ 902/5
4,650,975 3/1987 Kitchener ........................... 235/380

*Primary Examiner*—Harold Pitts
*Attorney, Agent, or Firm*—Antonelli, Terry, Stout & Kraus

[57] ABSTRACT

An advance transaction processing method in a transaction processing system for conducting transaction by inserting a card as a recording medium into an automatic teller machine by a user and carrying out input operation by the user, involves registering transaction assigning data for assigning transaction operation to be conducted by the user, a transaction restriction condition, and card identifying data on the card carried by the user; allowing an internal storage or a storage of the central processing unit connected to the automatic teller machine to store a transaction-operational procedure by using the transaction assigning data as a key for search; confirming as to whether the transaction restriction condition is satisfied, when the card is inserted into the automatic teller machine; reading the transaction-operational procedure by using the transaction assigning data recorded on the card as the key for search; and allowing the automatic teller machine to execute the processing for the transaction in accordance with the transaction-operational procedure.

15 Claims, 27 Drawing Sheets

FIG. 17B
FIG. 17
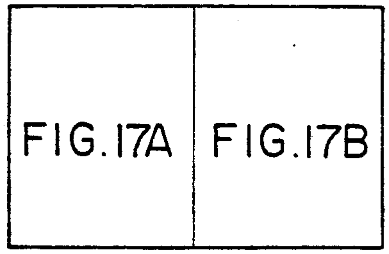
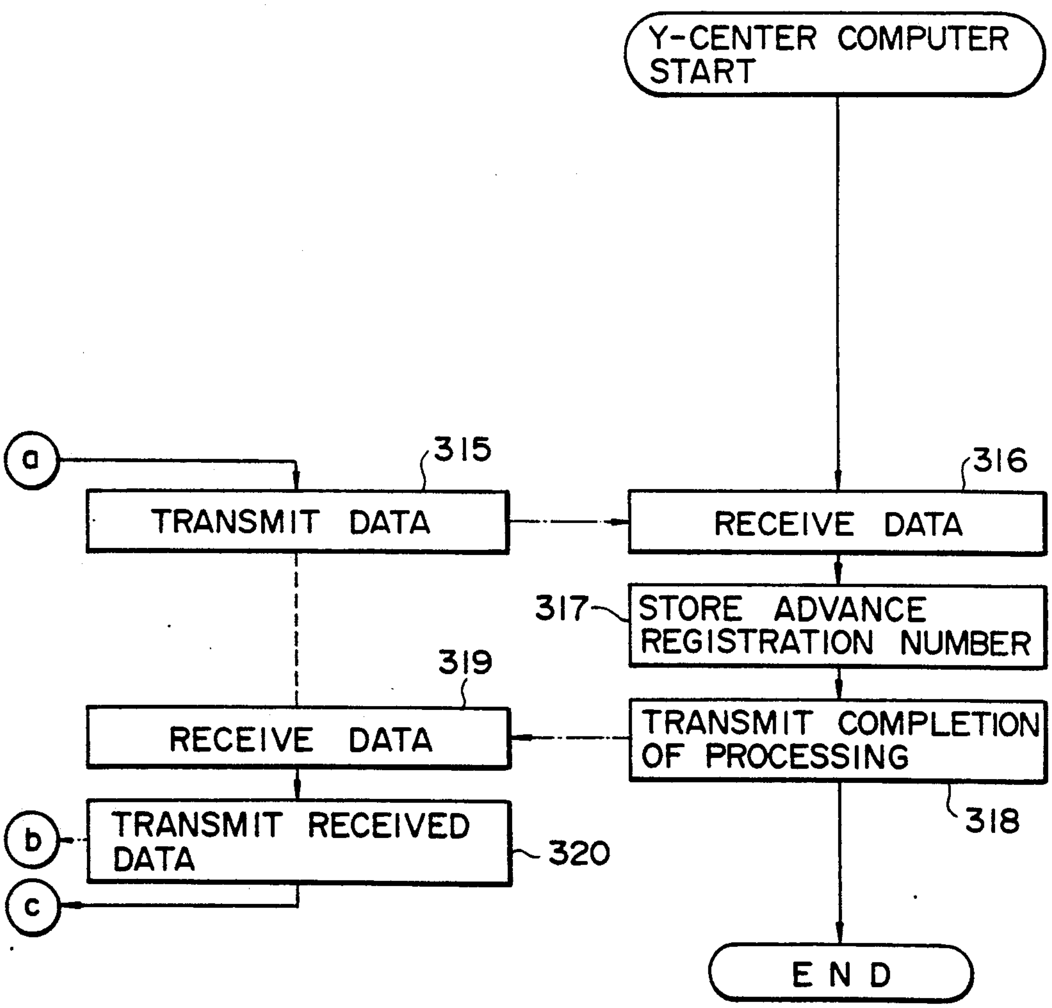

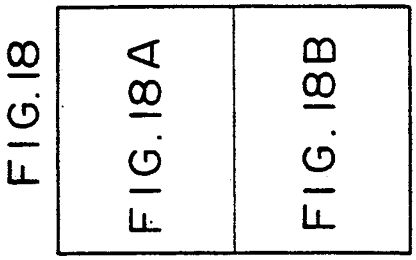
FIG. 18A
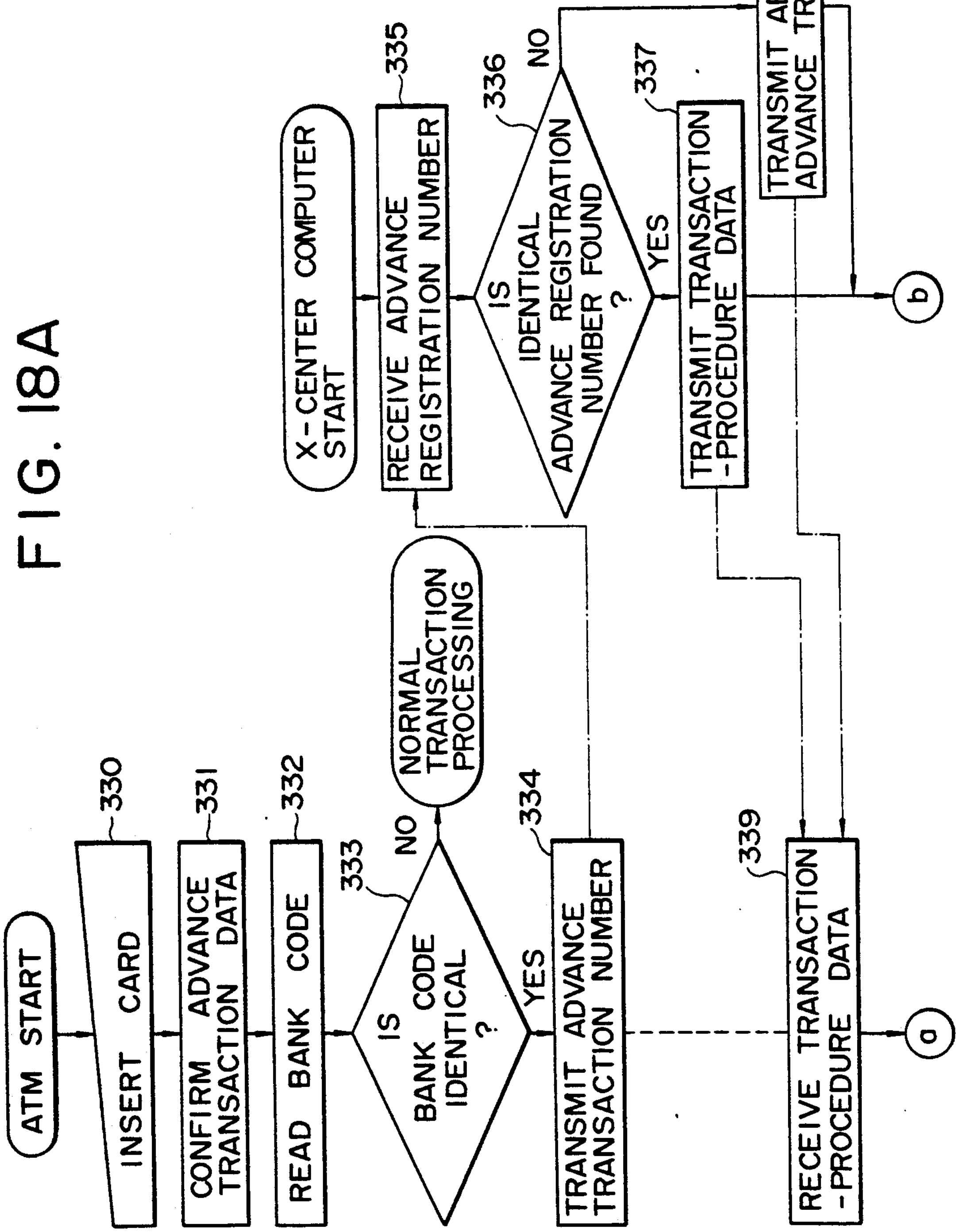

ADVANCE TRANSACTION PROCESSING METHOD

BACKGROUND OF THE INVENTION

The present invention relates to an advance transaction processing method and, more particularly, to an advance transaction processing method for implementing transaction through automatic teller machines to be used by banks and the like on the basis of advance data or information registered in advance on cards.

Automatic teller machines have currently been used by banks and so on extensively as tools for efficiently providing complicated over-the-counter services of banks and at the same time improving services for customers (users).

Heretofore, it has been of a common practice that the function of providing services for users through automatic teller machines has been fulfilled by such automatic teller machines disposed at banks or the like. And no services have yet been given for advance transaction, which can implement advance transaction on the basis of the transaction condition reserved in advance.

Technology of advance transaction services to be given through automatic teller machines of this kind is proposed by an automatic cash dispenser as disclosed in Japanese Patent Publication (laid open) No. 57-178,558 (1982). This automatic cash dispenser is constructed in such a system that cash is paid merely by inserting a card into a cash payment device on the basis of pre-registered request for cash payment through reservation over the telephone. This system construction can shorten a waiting time for drawing cash out. The method for reserving advance transaction through the automatic cash dispenser of this type involves requiring the user to make access to a cash payment device through a push-button type telephone and implementing advance transaction by transmitting numerical data or information such as account's number, an identification number of the card, an amount of money to be requested for withdrawal and so on required for the transaction through the numeral keys of the push-button type telephone in accordance with guidance on transaction operation to be given by a voice generator of the cash payment device.

Hence, the operation for transaction reservation through the automatic teller machine of the type as described hereinabove is such that instructions of the operation are given only by audio guidance through a receiver of the push-button type telephone, so that it may take the user a longer time to understand contents of the instructions or the user may sometimes miss the instructions through the receiver of the push-pull telephone. This is particularly so when the user is required to conduct operation for the automatic teller machine different from the operation, which is not accustomed to. Hence, such automatic teller machines have been laborious to handle for those who prefer to conduct transaction while making conversation with a teller over the counter of the bank or other banking organizations even if it would take them more time, rather than to tackle laborious operation of the automatic teller machines or who do not prefer to try to operate automatic teller machines of such a different type.

SUMMARY OF THE INVENTION

Accordingly, it is an object of the present invention to provide an advance transaction processing method which requires mere insertion of a card with data on advance transaction pre-registered thereon into an automatic teller machine without requiring any input of transaction data or information after the insertion of the card.

It is another object of the present invention to provide an advance transaction processing method which can execute transaction without complicated operation merely by inserting the card into the automatic teller machine once the content of a transaction condition under which the user intends to implement transaction would have been registered in advance on the card.

It is further object of the present invention to provide an advance transaction processing method which enables transaction without additional input operations except for insertion of the card into the automatic teller machine once the day and time as well as the transaction condition, respectively, on and at which and under which the user intends to implement transaction, would be registered in advance on the card through the automatic teller machine or relating device or through input from a terminal to be operated by a teller over the counter of the bank or banking organizations.

In order to achieve the objects, the present invention consists of an advance transaction processing method in a transaction processing system for executing transaction through insertion of a card as a recording medium into an automatic teller machine by a user and then through input operation by the user, which is characterized by recording data or information on transaction assignment for assigning the operation of transaction to be made by the user, data or information on a transaction restriction condition and on the identification of the card in data of the card to be carried by the user, storing data on a transaction-operational procedure using the data or information on the transaction assignment as a key for search in a central processing unit at the part of the automatic teller machine to which an internal storage or the automatic teller machine is connected, confirming that transaction restriction condition be cleared once the card is inserted into the automatic teller machine, reading the transaction-operational procedure by using the data or information on the transaction assignment recorded on the card, and executing transaction processing in accordance with the transaction-operational procedure concerned by the automatic teller machine.

The method for the registration of advance transaction for executing advance transaction processing is characterized by temporarily recording transaction-operational data or information on normal transaction processing to be executed by insertion of the card carried by the user into the automatic teller machine in the internal storage of the automatic teller machine or in a storage of the central processing unit to which the automatic teller machine is connected, as reserved registration data or information, requesting the user to select the necessity or unnecessity of repetitions of the transaction operation so far made for future advance transaction which follows, immediately prior to the end of the normal transaction, requesting the user to input transaction restriction condition for future advance transaction only when the user has selected to the effect that the future advance transaction be made under the same conditions as the current transaction, registering the transaction-operational data or information temporarily recorded, together with the transaction restriction condition, in the storage of the central processing unit connected to the automatic teller machine, as reserved registration data or information, recording the transaction assigning data or information functioning as a key data for searching the reserved registration data or information, and the transaction restriction condition previously inputted on the card inserted into the automatic teller machine, and returning the card to the user.

With this arrangement, when the user conducts advance transaction in the transaction processing system in which the advance transaction is carried out by requesting the user to insert the card as a recording medium carried by the user into the automatic teller machine and to input necessary data or information, the transaction assigning data or information for assigning the transaction operation to be conducted by the user and the transaction restriction condition is first recorded on the card as the recording medium on which data or information for identifying the card. At the part of the automatic teller machine, on the other hand, the transaction-operational procedure is stored as a key for search of the transaction assigning data or information in its internal storage or in a storage of the central processing unit to which the automatic teller machine is connected. The advance transaction is registered by the records in both the card and the automatic teller machine.

After the advance transaction has been registered, then the automatic teller machine confirms whether or the transaction restriction condition recorded on the card inserted is satisfied upon insertion by the user into the automatic teller machine of the card on which the advance transaction has been registered, then reads out the transaction-operational procedure by using the transaction assigning data or information recorded on the card as the key for search, and executes transaction processing in accordance with the transaction-operational procedure.

As described hereinabove, the advance transaction is registered by both the records of data or information on the advance transaction on the card and the records of data or information on the advance transaction (data or information on the transaction-operational procedure) in the internal storage of the automatic teller machine or in the storage of the central processing unit to which the automatic teller machine is connected. In order to simplify or expedite the processing of registration, the advance transaction processing according to the present invention is designed so as to record the input operation concerning the current transaction processing as data or information on transaction-operational procedure even subsequent to the normal transaction processing executed by the automatic teller machine and to use the data or information on the transaction-operational procedure as registered data on advance transaction to be done next. This arrangement can simplify operation for registering advance transaction. More specifically, since input-procedure data such as the content of transaction, identification number, a payment amount to be transacted, and so on, has already been established at the time of completion of the normal transaction processing, a series of such data or information together with an addition of the transaction restriction condition is recorded as data or information on the advance transaction to be conducted next in the internal storage of the automatic teller machine itself or in the storage of the central processing unit. The data or information is also recorded on the card which in turn is returned to the user.

Generally, the contents of the transaction of this type are repeated in substantially the same manner in many cases. Hence, as the transaction can be registered as it is intact as advance transaction subsequent to completion of the execution of the normal transaction processing through the automatic teller machine, operation for registering the advance transaction can be simplified due to completion of the registration of next advance transaction.

The transaction restriction condition is added to the card for the purpose to compete with burglary or robbery or loss of the card from the viewpoint of safety, and the transaction restriction condition that could be known to the very user only are set as one of data or information on the advance transaction. The transaction restriction condition are read out as the card has been inserted into the automatic teller machine, followed by checking whether the transaction restriction condition are matched. Therefore, as long as the transaction restriction condition could be checked by the automatic teller machine, any restriction condition can be used. For example, the name of the bank in which the automatic teller machine is installed, the local area in which the bank is located, the time band for transaction, and so on may be used as parameters for the transaction restriction condition. The addition of the transaction restriction condition can provide improved measures for safety to the card on which the advance transaction has been registered.

The card carried by the user has been recorded with data or information on the advance transaction assignment, the transaction restriction condition, and data or information on the identification of the card, and these data or information are read out by the automatic teller machine upon insertion of the card thereinto and the automatic teller machine then searches reserved operation-procedure recorded in the internal storage or in the central processing unit connected to the automatic teller machine. As the automatic teller machine could search the objective data or information, it is judged that the advance transaction has been registered, followed by reading out data or information on the transaction-operational procedure recorded.

As the automatic teller machine executes the transaction processing as regarding the read data or information on the transaction-operational procedure as if the user operates the procedure directly, the user can finish its transaction without executing any other operation except for insertion of the card into the automatic teller machine.

In the system construction in which data or information on the transaction-operational procedure is stored in the storage on the side of the central processing unit to which the automatic teller machine is connected, the data or information read from the card by the automatic teller machine is transmitted to the central processing unit which in turn conducts a search by using this data or information as search key data or information. Once the search would be successful, the central processing unit then transmits the read transaction-operational procedure to the automatic teller machine which in turn executes the transaction processing in substantially the same manner on the basis of the transmitted data or information on the transaction-operational procedure.

Other objects, features and advantages of the present invention will become apparent in the course of the description of the preferred embodiments, which follows, in conjunction with the accompanying drawings.

DETAILED DESCRIPTION OF THE PREFERRED EMBODIMENTS

Figure 1:
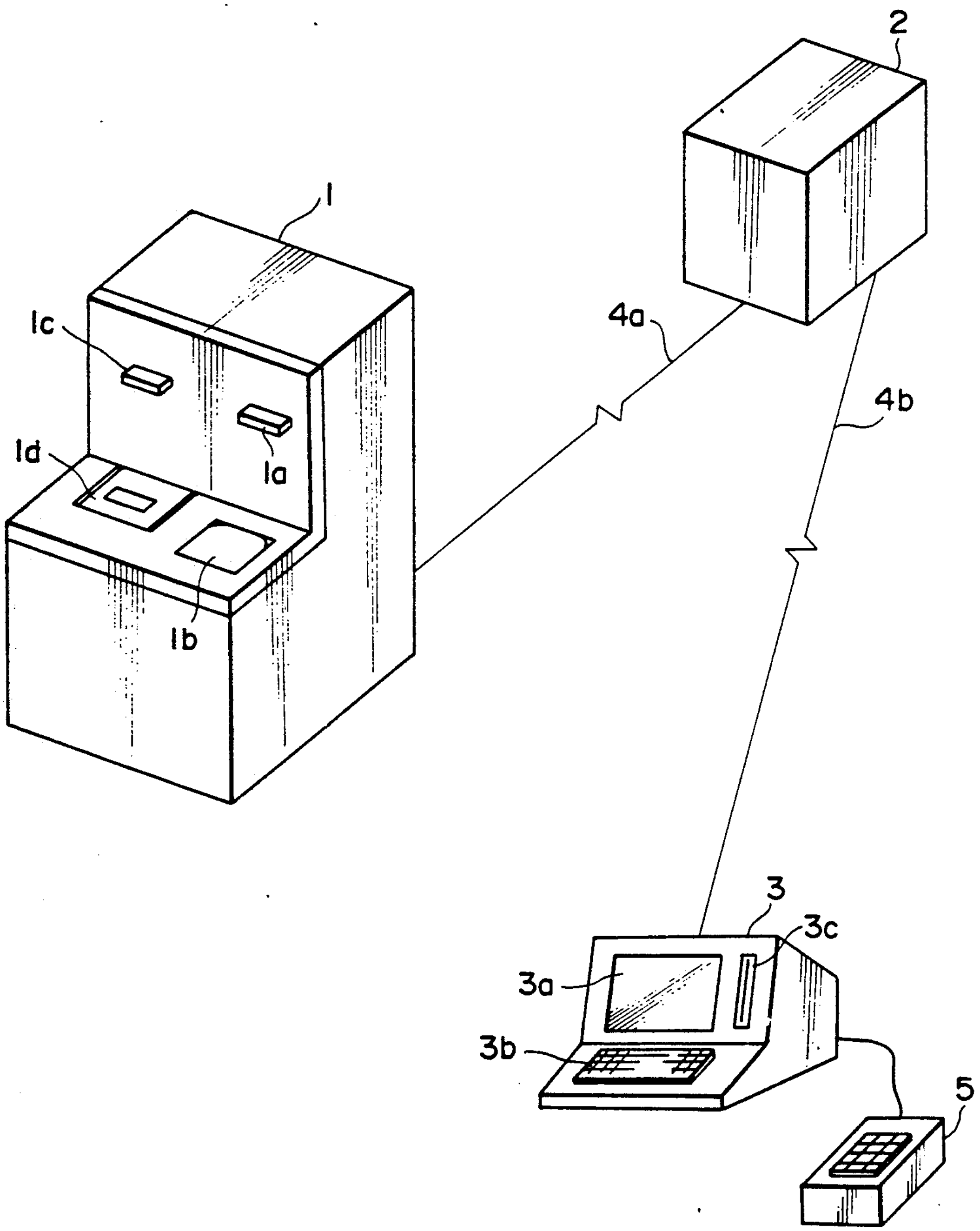
FIG. 1 is a brief perspective view showing a construction of an automatically cash transacting system for implementing an advance transaction processing method according to an embodiment of the present invention.

FIG. 1 is a brief perspective view showing the structure the automatically cash transacting system for implementing the advance transaction processing method according to an embodiment of the present invention. In the system structure as shown in FIG. 1, the system is constructed such that an automatic teller machine (hereinafter referred to as ATM) 1, a central processing unit 2 and a teller terminal equipment 3 are interconnected with each other through communication lines 4*a* and 4*b*. In this drawing, only each one of the ATM 1 and the teller terminal equipment 3 is indicated, however, a plurality of ATMs 1 and teller terminal equipments 3 may be connected to the central processing unit 2. The teller terminal equipment 3 is a terminal equipment to be operated exclusively by a bank clerk (hereinafter referred to a teller) of a bank or a banking organization. As shown in FIG. 1, the teller terminal equipment 3 comprises a main body consisting of a display unit 3*a*, a teller input unit 3*b*, and a card inlet/outlet unit 3*c* and a customer's ID number input unit 5 for inputting the user's (customer's) identification number connected to the main body of the teller terminal equipment 3. The ATM 1 is constructed such that an outer panel of its main body is provided with a touch input key and guidance display unit 1*b*, a bankbook inlet/outlet unit 1*c* and a bank note inlet/outlet unit 1*d*. The communication line 4*a* is to connect the ATM 1 to the central processing unit 2, while the communication line 4*b* is to connect the teller terminal equipment 3 to the central processing unit 2.

Figure 2:
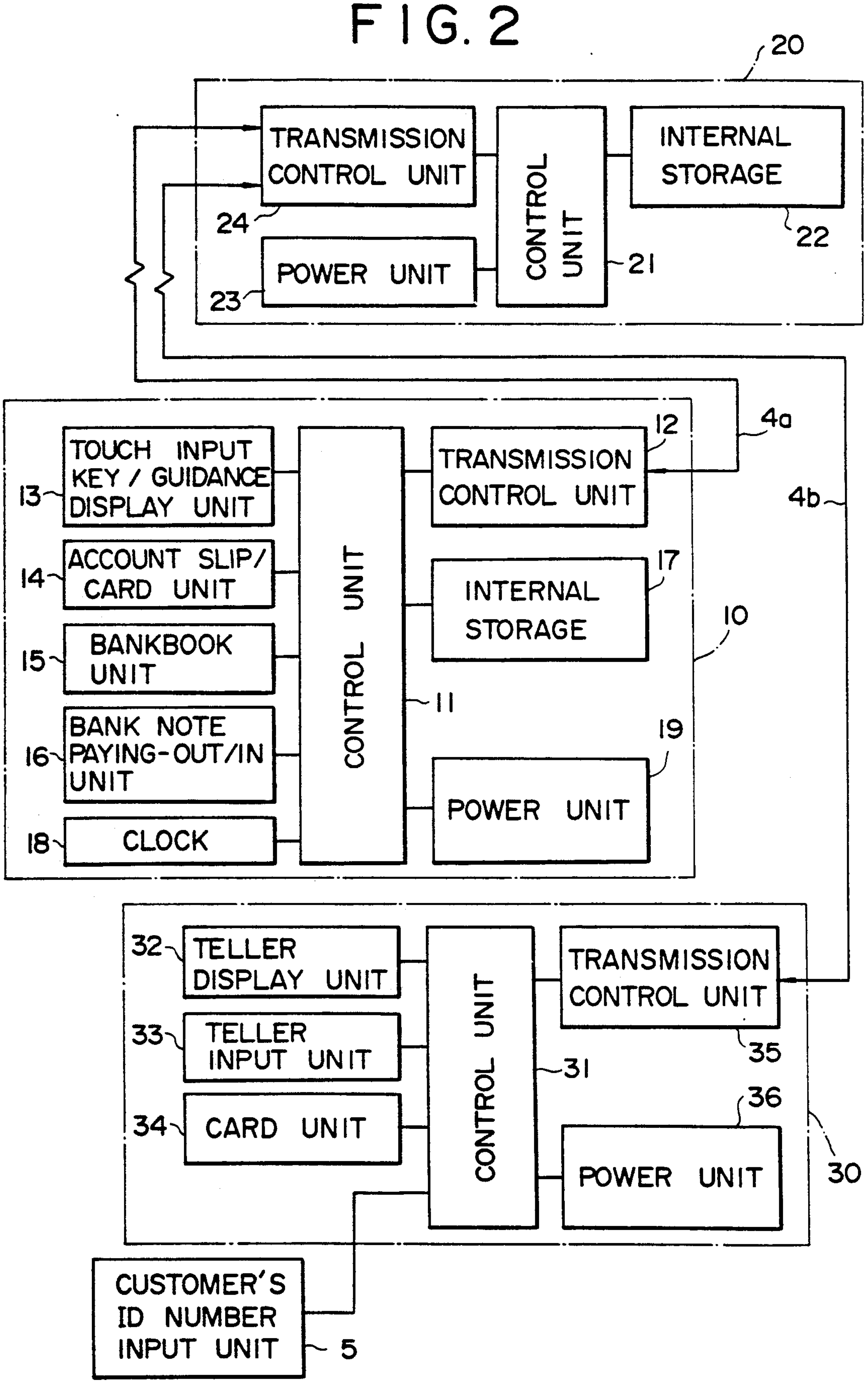
FIG. 2 is a block diagram showing a construction of an automatically cash transacting system for implementing an advance transaction processing method according to an embodiment of the present invention.

FIG. 2 is a block diagram showing the construction of the automatically cash transacting system for carrying out the advance transaction processing method according to an embodiment of the present invention. In the block diagram as shown in FIG. 2, the same elements as those shown in FIG. 1 are provided with the identical reference numerals.

Referring to FIG. 2, the main body 10 of the ATM 1 is constructed such that a control unit 11 for controlling each of units and a whole system is connected to a transmission control unit 12, a touch input key and guidance display unit 13, an account slip/card unit 14, a bankbook unit 15, a bank note paying-out/in unit 16, an internal storage 17, a clock 18, and a power unit 19. The transmission control unit 12 is a unit for controlling a communication line between the ATM and the central processing unit. The touch input key and guidance display unit 13 is a unit for displaying operational guidance on its display screen and accepting inputs through the touch input keys by the operator. The account slip/card unit 14 is a unit for printing and issuing an itemized account slip for transaction items as well as reading and writing a recording medium card, such as IC cards, RAM cards, magnetic cards or the like, through which transaction are done. The bankbook unit 15 is a unit for receiving and accepting a bankbook and printing out transaction items in predetermined positions of the bankbook. The bank note paying-out/in unit 16 is a unit for storing the bank notes the user has paid in and for paying out the bank notes the user has requested to pay out. The internal storage 17 is a unit of the storage in which data or information on identification or advance transaction are stored in the ATM itself, and the clock 18 is a unit having the clock function as transmitting the day and time of the transaction to the control unit 11. The power unit 19 is a unit for supplying power to the whole system of the device.

The main body 20 of the central processing unit 2 comprises a control unit 21, an internal storage 22, a power unit 23 and a transmission control unit 24. The internal storage 22 stores data or information on transaction-operational procedure registered as advance transaction. The transmission control unit 24 controls the communication line 4*a* between the central processing unit 2 and the ATM 1 and it likewise controls the communication line 4*b* between the central processing unit 2 and the teller terminal equipment 3. The power unit 23 is to feed power to the whole units of the central processing unit.

As shown in FIG. 2, the main body 30 of the teller terminal equipment 3 is constructed such that a control unit 31 for controlling each of the units of the teller terminal equipment and controlling its whole system is connected to a teller display unit 32 for displaying guidance, a teller input unit 33 for inputting transaction or information necessary for the teller, a card unit 34, a transmission control unit 35 and a power unit 36. The transmission control unit 35 is to control the communication line 4*b* between the teller terminal equipment 3 and the central processing unit 2, and the power unit 36 is to supply power to the whole system of the teller terminal equipment 3. The transmission control unit 35 and the power unit 36 have the same functions as the central processing unit 2 and the ATM 1. The card unit 34 is a unit for reading or writing the card as a recording medium, such as IC cards, RAM cards, magnetic cards, or the like, on which data or information for transaction is recorded. To the teller terminal equipment 3 is further connected to the customer's ID number input unit 5 for inputting user's identification number as an externally separate unit. The input unit 5 for inputting the user's identification number is an input unit for inputting the identification number through which the user is requested by the teller over the counter to input its identification number in order to identify the user.

Description will be made of the advance transaction processing method in the automatically cash transacting system having the construction as described hereinabove.

Before description is made on operation of the advance transaction processing method, necessary data or information, such as transaction data or information, advance data or information and so on, recorded on the card to be used for the advance transaction processing will first be described.

Figure 3:
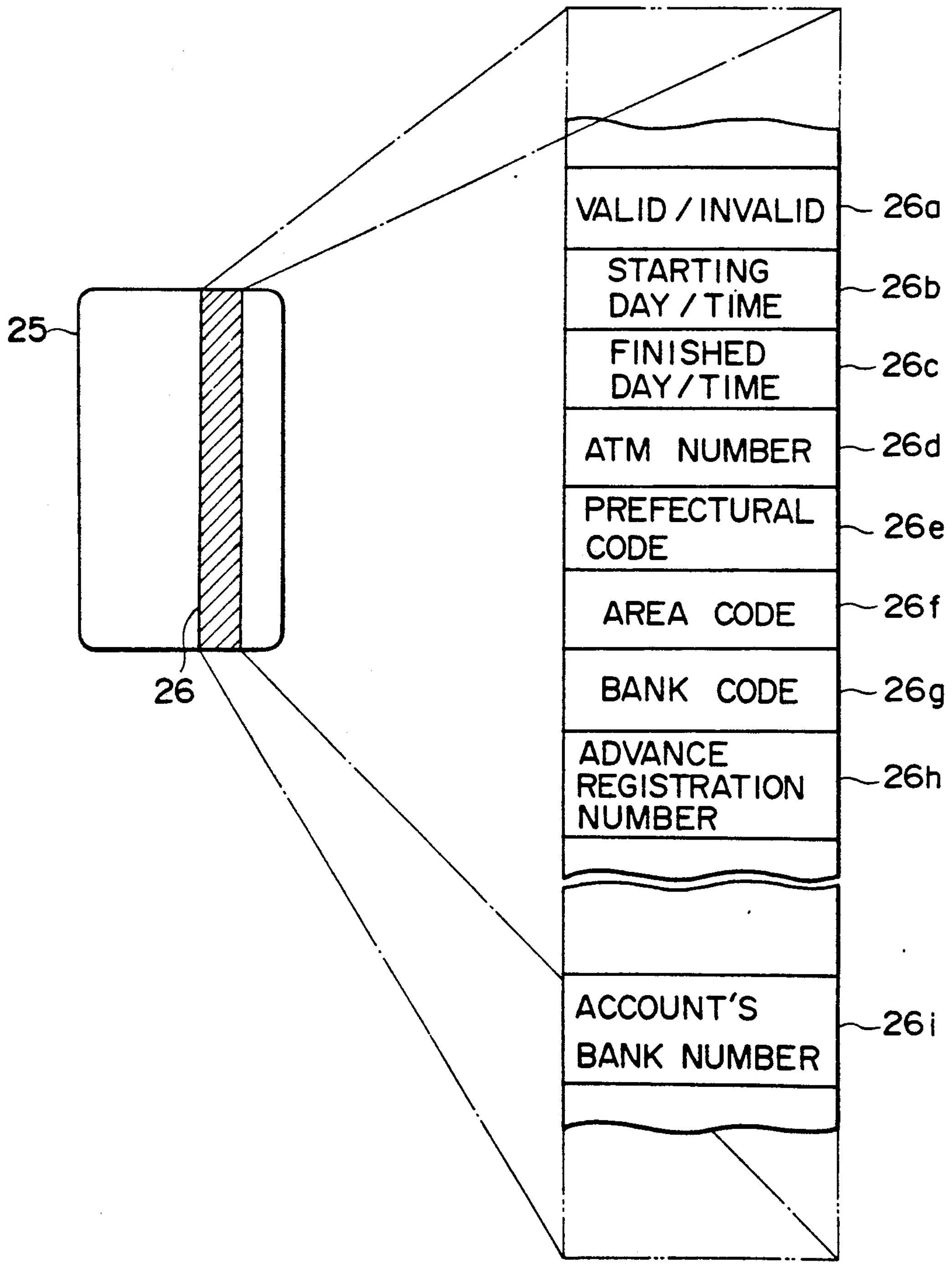
FIG. 3 is a diagrammatic representation of an example of a data format of advance data or information recorded on a magnetic card.

FIG. 3 is a diagrammatic representation showing an example of a data format of advance data or information recorded on the magnetic card. As shown in FIG. 3, a magnetic stripe 26 of the magnetic card 25 is recorded with data or information on advance transaction, such as valid/invalid data 26*a* indicative of validity or invalidity of advance transaction, data 26*b* indicative of starting day and time for transaction, data 26*c* indicative of finished day and time for transaction, data 26*d* indicative of the ATM number for identifying the ATM from a plurality of ATMs, data 26*e* indicative of the prefectural code of the prefecture in which the ATM is installed, data 26*f* indicative of the area code of the district exclusively allocated for identifying the district of the prefecture in which the ATM is installed, data 26*g* indicative of the bank code exclusively allocated for identifying the bank or banking organization in which the ATM is running, data 26*h* indicative of the advance registration number exclusively allocated for each registration of advance transaction, and data 26*i* indicative of the account's bank number indicating the bank or banking organization in which the account of the owner of the card is opened.

Figure 4:
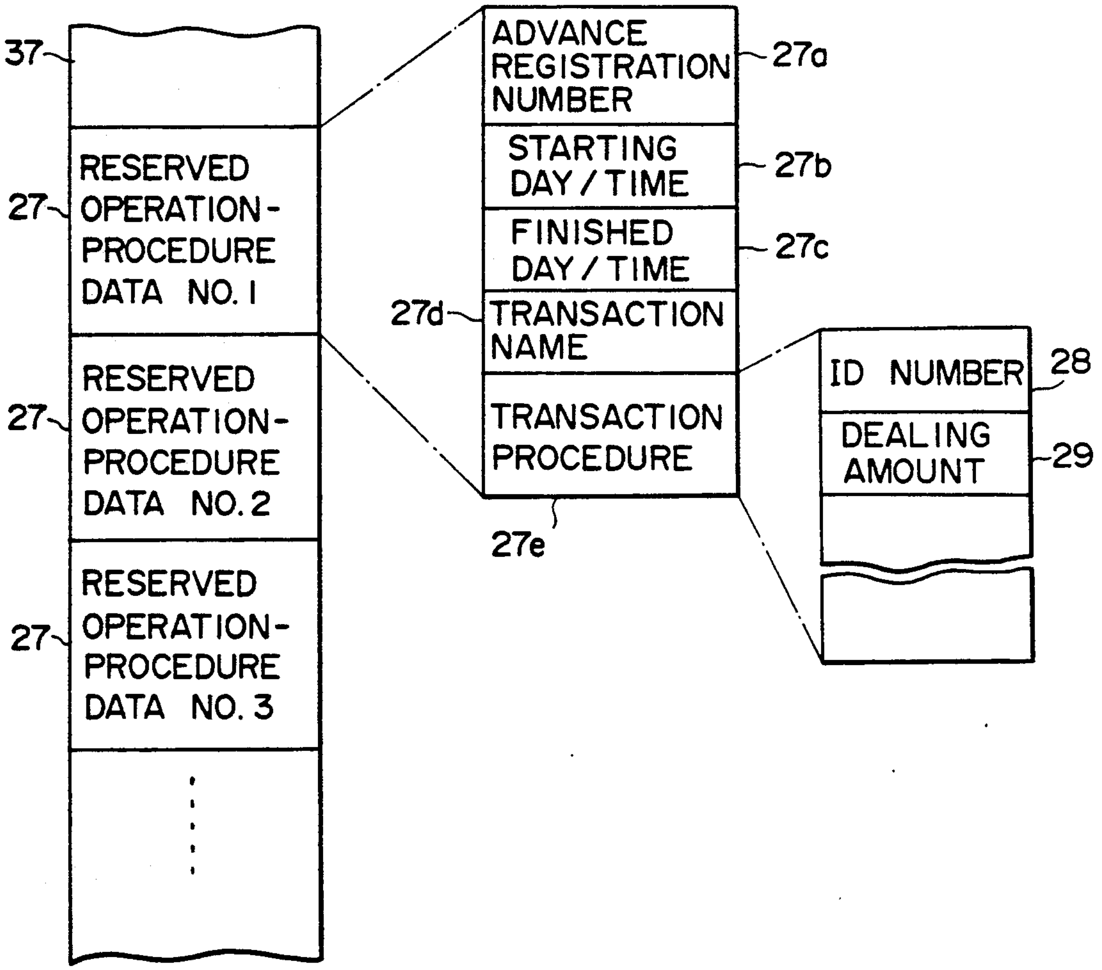
FIG. 4 is a diagrammatic representation of an example of a data format of data or information on advance transaction registration to be stored in a storage of a central processing unit or in an internal storage of an automatic teller machine (ATM) in registering advance transaction.

FIG. 4 is a diagrammatic representation showing an example of a data format for advance transaction registration data or information to be stored by the storage of the central processing unit or the internal storage in the ATM in registering the advance transaction. As shown in FIG. 4, the advance transaction registration data or information is composed of reserved operation-procedure data 27 in correspondence to each of transactions. The reserved operation-procedure data 27 comprises data on the advance registration number 27*a*, the starting day/time 27*b* indicating the scheduled day/time for starting the transaction, the finished day/time 27*c* indicating the scheduled day/time for finishing the transaction, the transaction name 27*d* indicating contents of the transaction, and the transaction procedure 27*e* describing the operation procedure necessary for the advance transaction. The data on the transaction procedure 27*e* contains each data on the identification number 28 and the payment amount 29 to be transacted.

A plurality of plural reserved operation procedure data 27 are aggregated into a reserved operation-procedure data file 37 for the advance transaction registration data or information, the reserved operation-procedure data 27 being aggregated using, as a unit of search data, the advance registration number 27*a*, the starting day/time 27*b* indicating the scheduled starting day/time for starting the transaction, the scheduled finished day/time 27*c* indicating the scheduled day/time for finishing the transaction, the transaction name 27*d* indicating contents of the transaction, and the transaction procedure 27*e* describing the operation procedure necessary for the advance transaction.

Figure 5:
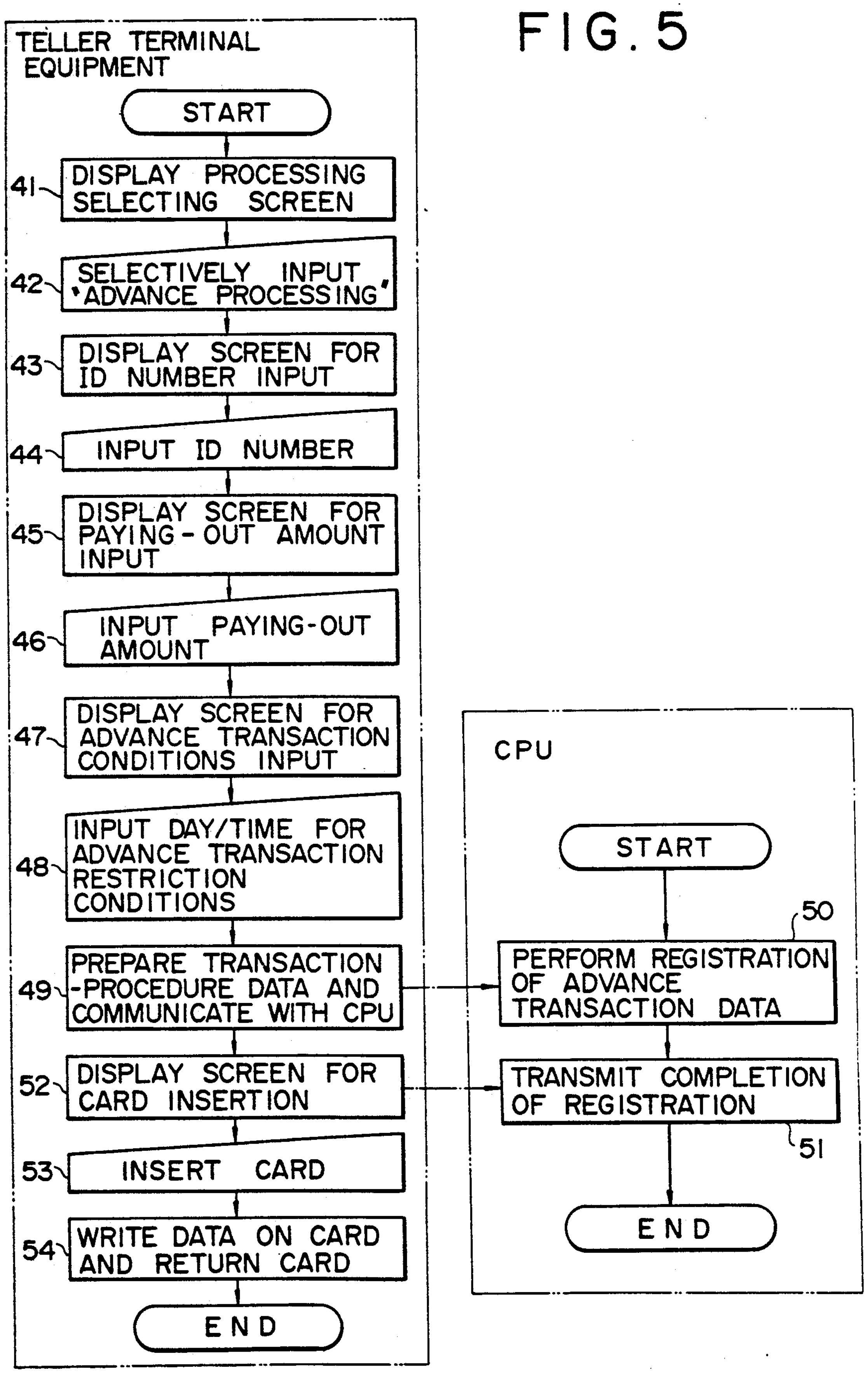
FIG. 5 is a flow chart showing a processing program flow in which a teller of a bank or other banking organization is requested to register advance transaction on behalf of the user through a teller terminal equipment.

FIG. 5 is a flow chart indicating a processing flow in which a teller of the bank or banking organization registers the advance transaction for the user through the teller terminal equipment. In the processing flow as shown in FIG. 5, a series of processing is implemented from the recording through the teller terminal equipment in the storage of the central processing unit to the registration of the advance transaction. The processing for registering this advance transaction presents an example of processing the registration of the advance transaction for drawing cash out (payment transaction) through the teller terminal equipment to be operated by the teller upon conversation with the customer (user).

Description will be made on the processing flow of FIG. 5. First, at step 41, a processing selecting screen is displayed on a display screen of the teller display unit of the teller terminal equipment. Then, at step 42, the teller operates the teller input unit in accordance with the instructions on the processing selecting screen displayed, thereby inputting a desired advance transaction processing. As the advance transaction processing is selected, the program flow proceeds to step 43 at which a screen for the input of the identification number is displayed, thereby requesting the operator to input the identification number. When the display screen instructs the operator to input the identification number, the teller requests the user to input its identification number. Following the instructions, the user inputs its identification number through the input unit 5 for inputting the user's identification number at step 44. After the identification number has been inputted, the program flow goes to step 45, the display screen of the teller display unit displays a screen for displaying the input of the payment amount the user intends to draw out. Once the instructions to the effect that the payment amount to be paid out be inputted has been displayed on the display screen of the teller display unit, the teller requests the user for the payment amount the user intends to draw out and then the teller inputs the payment amount requested at step 46. At step 47 subsequent to step 46, a screen for the input of the advance transaction restriction condition is displayed. By displaying the screen for requesting the operator to input the advance transaction restriction condition on the display screen of the teller display unit of the teller terminal equipment, the teller asks the user for advance transaction restriction condition and inputs the advance transaction restriction condition on the basis of response to the teller's inquiry at step 48. For instance, the scheduled day/time for the advance transaction is inputted as an advance transaction restriction condition. Then, at step 49, operation-procedure data is formed for executing advance transaction through the ATM on the basis of the advance transaction data or information inputted during the processes so far made, and a communication is then made with the central processing unit, thereby transmitting the operation-procedure data to the central processing unit as the advance transaction data or information. The advance transaction data or information is transmitted through the transmission control unit and the communication lines. Upon receipt of the operation-procedure data for the advance transaction data or information, the central processing unit registers the advance transaction data or information at step 50. As the registration for the advance transaction data or information has been finished, then the program flow goes to step 51 at which a message is transmitted to the teller terminal equipment to the effect that the advance transaction data or information has been registered. The processing for the registration of the advance transaction data or information by the central processing unit is implemented by allowing the transmission control unit 24 of the central processing unit 2 to transmit data received to the control unit 21, allowing the control unit 21 to record the data on the starting day/time 27*b* for the advance transaction, the finished day/time 27*c* therefor, the transaction name 27*d*, the identification number 28 and the payment amount 29 to be transacted (FIG. 4) in the corresponding accommodation positions as one of reserved operation-procedure data 27 of the reserved operation-procedure data file 37 stored in the internal storage 22, then recording a series of advance registration number 27*a* managed by the central processing unit 2, thereby finishing the registration of the advance transactions data or information.

Upon receipt of the message at step 51 to the effect that the advance transaction data or information has been finished, the teller terminal equipment 3 transmits the received message through the transmission control unit 35 to the control unit 31 which in turn transmits the advance transaction data or information on the starting day/time and the finished day/time for the advance transaction, the advance registration number, and the valid/invalid data indicative of the validity of the advance transaction to the card unit 34. Then, at step 52, a screen for inserting the card is displayed and, at step 53, the teller inserts the card into the card unit 3 4 on behalf of the user according to the instructions on the insertion of the card. Then the program flow proceeds to step 54 at which advance transaction data or information on the starting day/time 26*b* and the finished day/time 26*c* for the advance transaction, the advance registration number 26*h*, and the valid/invalid data 26*a* indicative of validity of the advance transaction is written on the magnetic stripe portion of the card, and the card is then returned to the user.

The advance transaction can be registered by recording the advance transaction data or information on the user's card and at the same time recording of the advance transaction data or information in the storage of the central processing unit by means of a series of operation and processing as described hereinabove through operation of the teller terminal equipment by the teller.

Figure 6A:
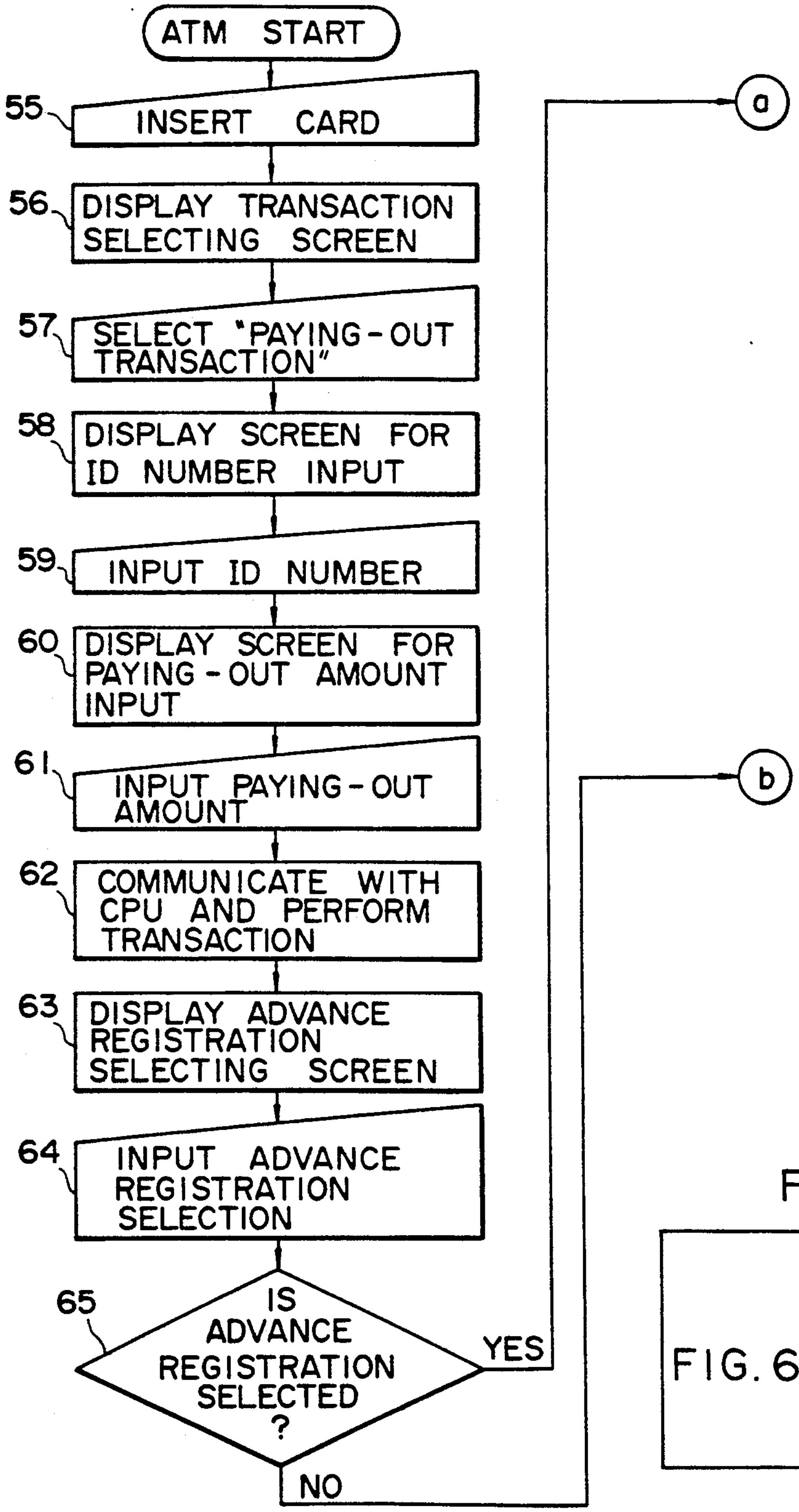
FIG. 6 (FIG. 6A and FIG. 6B) is a flow chart showing a processing program flow in which a transaction for drawing cash out is reserved in the same content of transaction immediately after the user has conducted the same transaction for drawing cash out through the ATM.
Figure 6:
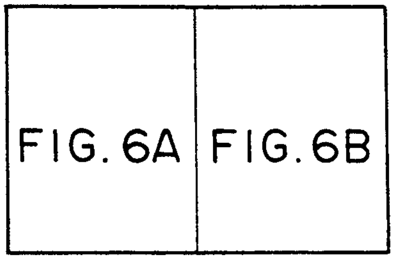
Figure 6B:
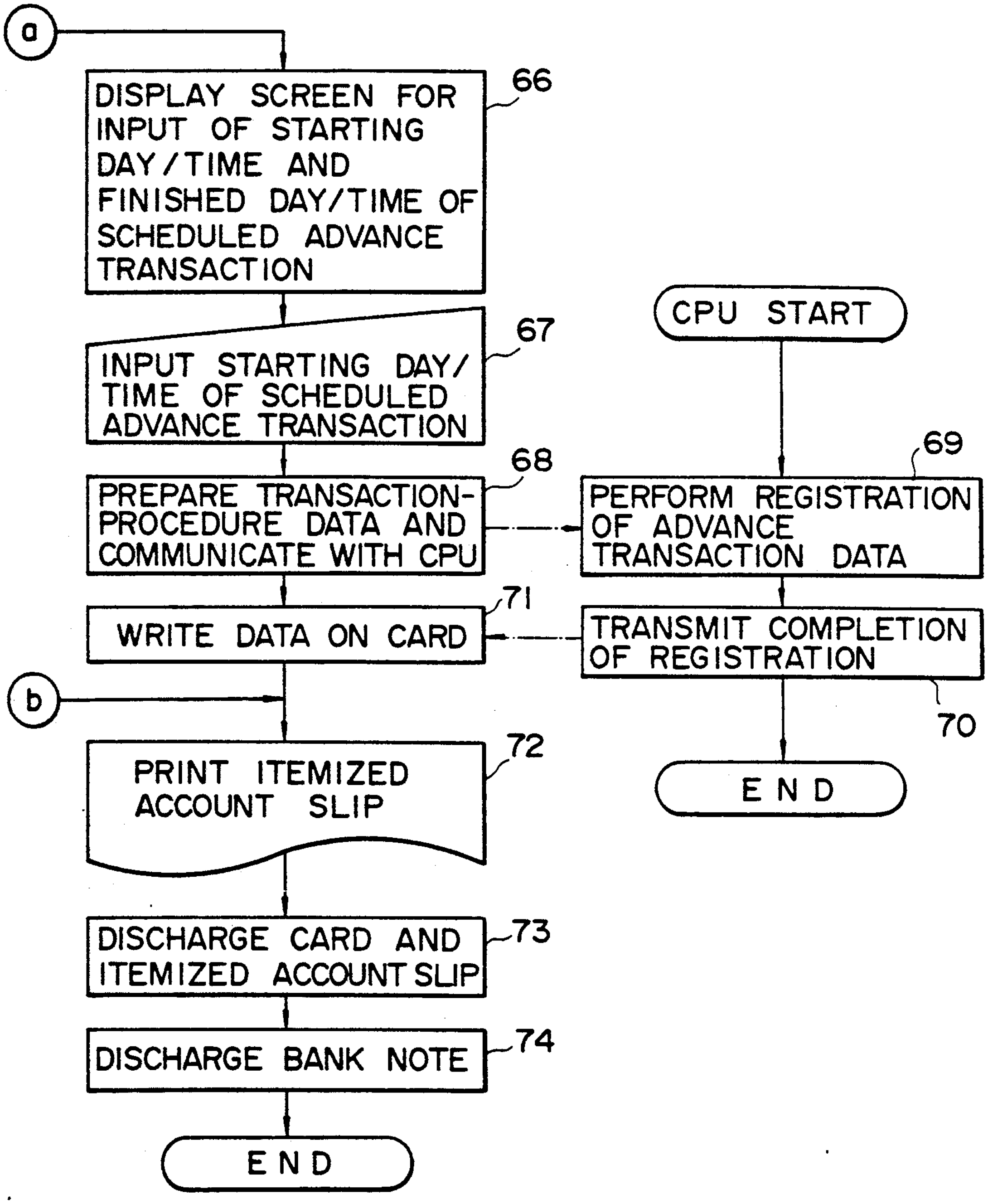

FIG. 6 is a flow chart showing the processing flow for advance payment transaction under the same condition immediately after the user has conducted the advance payment transaction through the ATM. In this drawing, there is shown a series of the processing flow for registering the advance transaction by recording in the storage of the central processing unit through the ATM.

Description will be made with reference to FIG. 6. This registration processing of the advance transaction is to register the transaction to be made later as the advance transaction in the same content of the transaction which has so far been conducted by means of a series of operations immediately prior to the finish of the normal transaction processing through the ATM. In the processing flow of FIG. 6, the processing from step 55 to step 62 involves the normal transaction processing through the ATM.

First, at step 55, the processing by the ATM starts by having the user insert the card into the card inlet/outlet and itemized account slip outlet 1a in accordance with the display on guidance indicated on the touch input key and guidance display unit 1b of the ATM 1. Then, at step 56, the screen display on the touch input key and guidance display unit has been changed and the transaction selecting screen is displayed. At step 57, the user selectively inputs "payment transaction" in accordance with the display on the transaction selecting screen. As the selective input of the transaction has been made, the program flow proceeds to step 58 at which the screen displays a request for the input of the user's identification number. Then, at step 59, the user inputs its identification number and, at step 60, the screen displays a request for the input of the payment amount requested by the user to draw out. The program flow proceeds to step 61 at which the user inputs the payment amount the user requests to draw out.

This concludes the input of data required for the payment transaction. Then, at step 62, a communication is made with the central processing unit to implement the transaction processing. The control unit 11 makes communication on the payment transaction with the central processing unit 2 through the transmission control unit 12 and the communication line 4a followed by the transaction processing. As the payment transaction has been accepted and the transaction processing has been finished, the program flow proceeds to step 63 at which an advance transaction registration data or information is outputted and displayed on the touch input key and guidance display unit. Then, at step 64, the user selects the item of the transaction displayed on the screen and inputs the item of the transaction followed by proceeding to step 65 at which a decision is made to determine if the advance registration is to be selected. When the result of decision at step 65 indicates that the advance selection is selected, then the program flow goes to step 66 at which the screen displays a request for the input of the scheduled starting day/time and finished day/time for the advance transaction, followed by the program flow proceeding to step 67. As the user inputs the scheduled day/time for the advance transaction at step 67, a series of the operation-procedure data is formed at step 68 from the data which was inputted by the user and the data on operation-procedure for the payment transaction which has already been registered in a series of the previous transaction processing (steps 59 and 61), and the operation-procedure data is combined with the data on the scheduled day/time for the advance transaction, thereby forming data on the advance registration data or information, followed by communication with the central processing unit to process the registration of the advance transaction. In other words, the ATM 1 transmits the advance registration data or information through the transmission control unit 12 and the communication line 4a to the central processing unit 2, and the transmitted data is received by the transmission control unit 24 of the central processing unit 2, which in turn transmits the data to the control unit 21. The control unit 21 of the central processing unit 2 records the received data on the starting day/time 27b for the advance transaction, the finished day/time 27c for the advance transaction, the transaction name 27d, the identification number 28 and the payment amount 29 to be transacted in its corresponding positions of one of the reserved operation-procedure data 27 stored in the internal storage 22 of the central processing unit 2 and, finally, records a series of the advance registration number 27a managed by the central processing unit 2, followed by the completion of the advance registration. The registration processing of the advance transaction data or information is implemented at step 69 of the processing flow at the part of the central processing unit 2. As the advance registration processing has been finished at step 69, the program flow goes to step 70 at which a message on the completion of the advance registration is transmitted from the control unit 21 through the transmission control unit 24 and the communication line 4a to the ATM 1, together with the advance registration number. Upon receipt of this message, the control unit 11 of the ATM 1 writes the data on the card at step 71. The processing for writing the data on the card is implemented by transmitting the received advance registration number and data on the scheduled starting and finished day/time for the advance transaction and the validity of the advance transaction to the account slip/card unit 14 and having the data on the advance transaction data or information written on the magnetic stripe portion of the magnetic card inserted for the current transaction. Then the program flow proceeds to step 72.

At step 64, on the other hand, when the item "advance registration" is not selected on the screen displayed for a request for the input of items of transaction, the transaction requested to be made by the user is regarded as normal transaction. Hence, a decision is made at step 65 that the requested transaction is not registered as an advance registration, followed by proceeding to step 72 at which instructions are given to the account slip/card unit 14 to print out the item of the transaction on an itemized account slip. Then, at step 73, the card and the itemized account slip are discharged and returned to the user. Thereafter, at step 74, the bank notes equivalent of the payment amount requested by the user to draw out are paid out, thereby concluding a series of payment transaction and registration of the transaction.

As have been described hereinabove, the processing for the registration of the advance transaction in this case involves inquiring into the possibility of executing the current transaction as advance transaction in the future, immediately prior to the finish of a normal payment transaction and, when advance transaction is requested, recording the advance transaction procedure data and data functioning as a key for search of the advance transaction procedure data on the card of the user and in the central processing unit.

Description will then be made on an example in executing the advance transaction processing subsequent to the registration of the advance transaction.

Figure 7A:
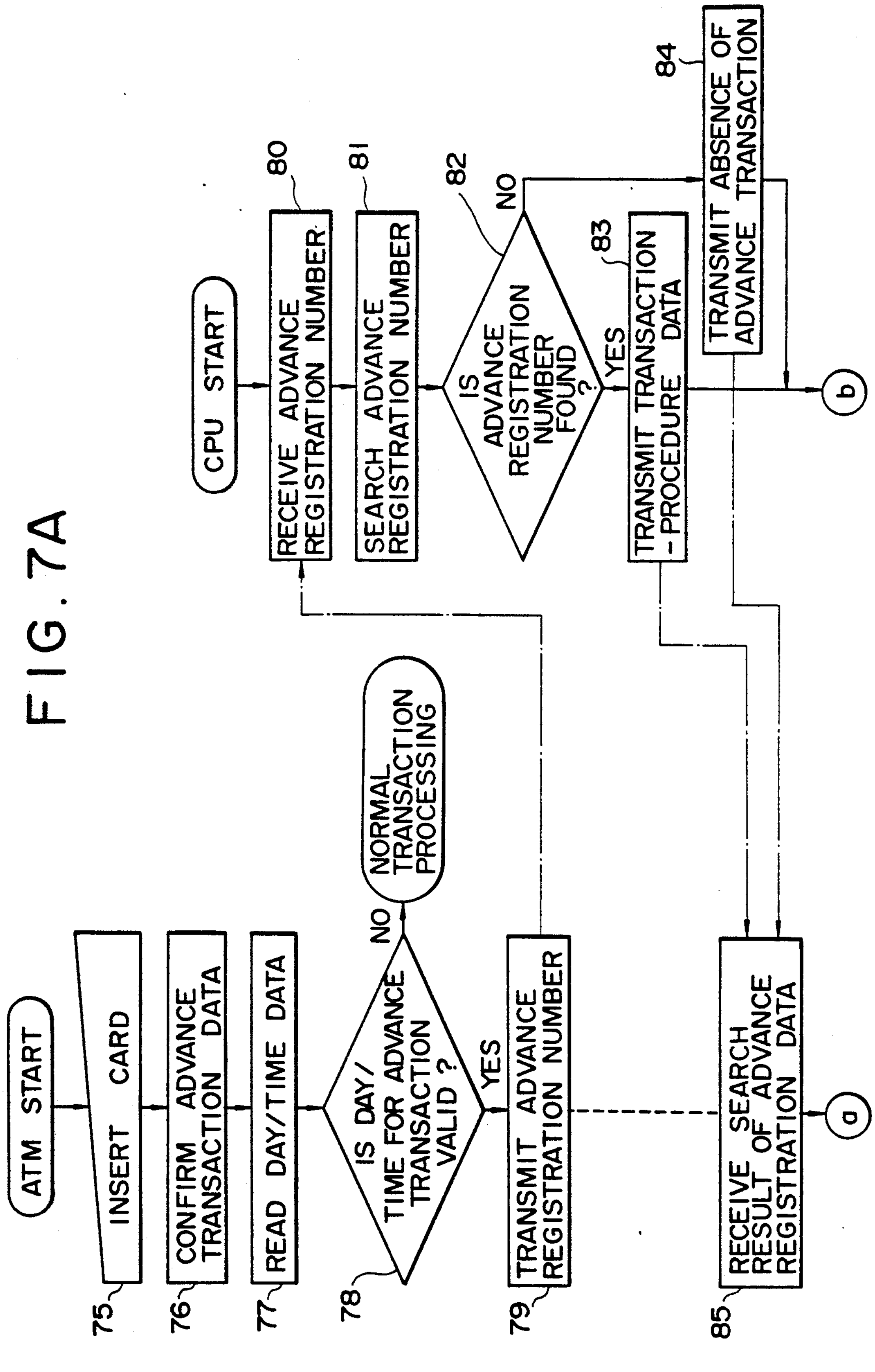
FIG. 7 (FIG. 7A and FIG. 7B) is a flow chart showing a processing program for implementing advance transaction processing when the advance transaction has been registered in a central processing unit of a center computer.
Figure 7B:
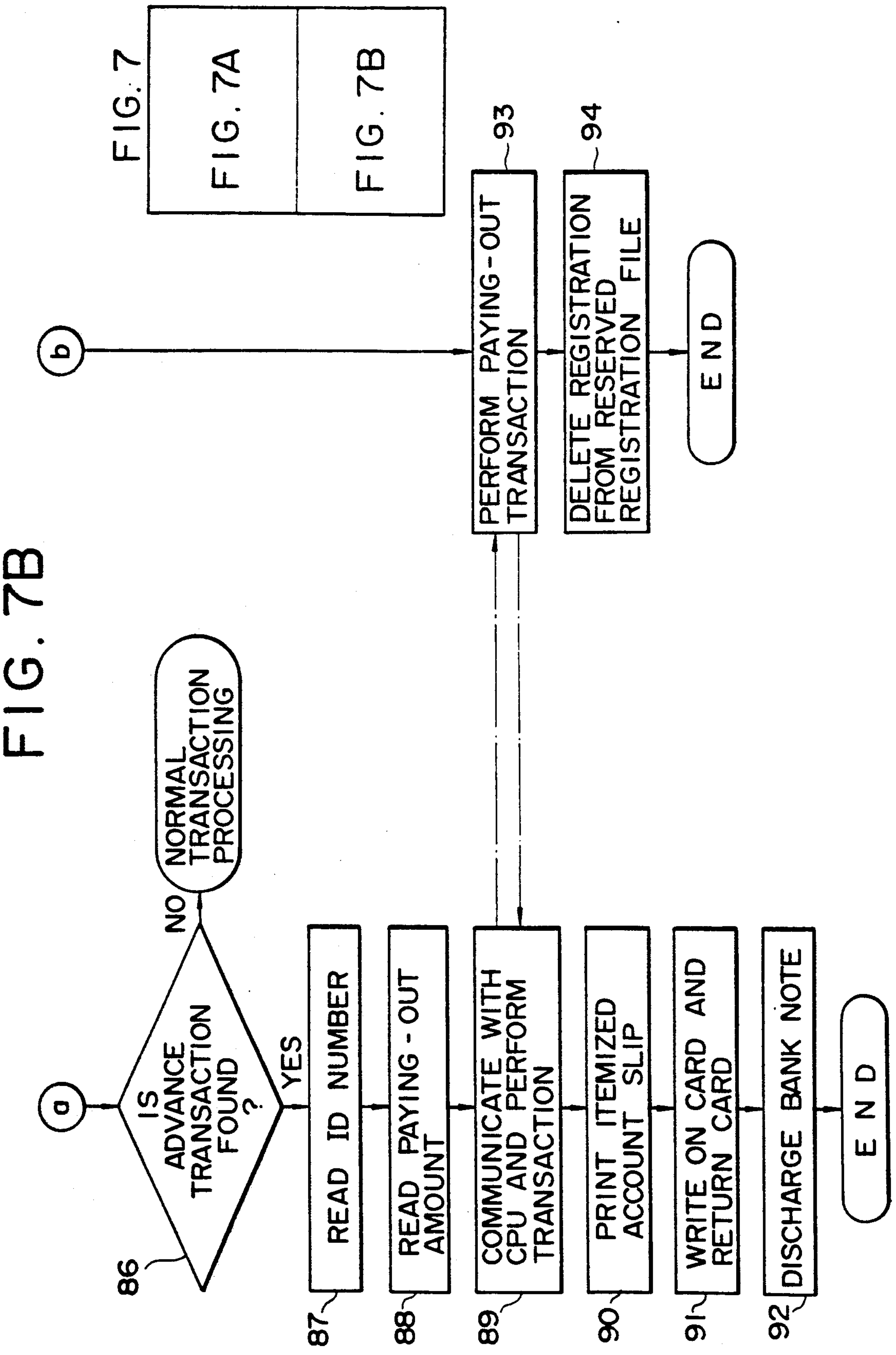

FIG. 7 is a flow chart showing the processing flow for the advance transaction processing when the advance transaction has been registered in the central processing unit of a center computer. This processing flow is to process cash payment transaction by the user using the card on which the advance transaction has already been registered.

The execution of the advance transaction processing will be described with reference to FIG. 7. For the advance transaction, data on the scheduled day/time for the advance transaction is set in a predetermined period of time as a transaction restriction condition. First, at step 75, the user is requested to insert the card into the card inlet/outlet and itemized account slip outlet 1a in accordance with guidance displayed on the touch input key and guidance display unit of the ATM. As the card is inserted, the program flow goes to step 76 at which the account slip/card unit 14 reads the data recorded on the card in order to confirm its advance transaction data or information and to check whether or not the requested transaction is to be handled as advance transaction. Then, at step 77, data on the current day/time is read out rom the clock 18 (FIG. 2) built in the ATM and, at step 78, a decision is made to determine if the transaction has been requested to be settled on the validly scheduled day/time. If the result of decision at step 78 indicates that a request for the advance transaction has been made on the invalid scheduled day/time, on the one hand, then the requested transaction is regarded as a normal transaction and the program flow goes to a routine for normal transaction processing at which it is subjected to normal transaction processing. When it is decided at step 78 that the day/time requested for the transaction is valid, on the other hand, the program flow proceeds to step 79 at which the advance transaction is executed in the following processing flow.

The advance transaction is executed by first recording the advance transaction data or information on the card inserted into the ATM, together with data or information on the advance transaction, in the storage of the ATM, followed by transmitting the advance registration number to the center computer containing the central processing unit in which the advance transaction has been registered (step 79). As the advance registration number has been transmitted rom the ATM at step 79, the center computer receives the advance registration number at step 80, followed by proceeding to step 81 at which the advance registration number is searched. Then, at step 82, a decision is made to determine if the advance registration number is located. When the result of decision at step 82 indicates that the advance registration is found, on the one hand, the program flow goes to step 82 at which the transaction procedure data is read out using the advance registration number as a key data and it is transmitted to the ATM. If the result of decision at step 82 indicates that no advance registration number is located, on the other hand, then a message is transmitted at step 84 to the effect that the advance registration number could not be found. More specifically, in the central processing unit 20 of the center computer, the control unit 21 searches the advance registration number 27a identical to the advance registration number of the received data, the scheduled starting day/time 27b for the advance transaction, the finished day/time 27c for the advance transaction and the transaction name 27d from each of the reserved operation-procedure data 27 of the reserved operation-procedure data file 37 recorded in the internal storage 22 by using the advancer registration number of the received data as a key for search, so as to find the reserved operation-procedure data 27 identical to that registered in the received data. When the identical reserved operation-procedure data 27 has been searched from the internal storage, then the operation-procedure data 27e (identification number 28 and amount of money to be transacted, 29) is read and transmitted through the transmission control unit 24 and the communication line 4a to the ATM 1.

Then, at step 85, the ATM 1 receives the transmission of the search result of the advance registration data or information and, at step 86, a decision is made to determine if the advance transaction has been located. If the result of decision at step 86 indicates that neither advance transaction nor advance registration data are found, then the transaction requested is regarded as normal transaction so that the program flow goes to a routine for the normal transaction processing in which the requested transaction is processed in accordance with the normal transaction processing. When the result of decision at step 86 indicates that the advance transaction is registered in the center computer, then the program flow proceeds to step 87 at which the advance transaction processing is executed. The advance transaction processing is executed by first reading out the identification number at step 87 and the payment amount to be transacted at step 88 from the transaction procedure data of the advance transaction registration data or information. Then the transaction processing is executed at step 89 and steps which follow. More specifically, as all the necessary data has been gathered at the previous steps, a communication is made with the central processing unit at step 89 to execute the transaction processing. A specification of the result of the transaction processing is printed out on an itemized account slip at step 90 and data on the completion of execution of the advance transaction is written on the card followed by the return of the card at step 91. Thereafter, at step 92, the bank notes equivalent of the payment amount requested to be settled through the advance transaction by the user are paid out to the user, thereby finishing the transaction processing.

On the other hand, the central processing unit at the part of the center computer executes the processing of the corresponding payment transaction at step 93, in response to the communication from the ATM at step 89, and deletes the registration of the executed advance transaction from the reserved registration data file, followed by the completion of the processing.

As described hereinabove, the advance payment transaction is carried out by transmitting the advance registration number, reading the registered transaction procedure data using the advance registration number as a key data for search, and executing the payment transaction of bank notes on the basis of the read transaction procedure data in such a manner as will be described hereinafter, without special operation of the ATM. In other words, the identification number 28 and the payment amount 29 to be paid out are read from the data on the transaction procedure 27e registered as the advance transaction registration data or information (at steps 87 and 88), and the payment transaction is communicated through the transmission control unit 1 and the communication line 4a to the central processing unit 2 (at step 89). When the payment transaction has been accepted, the control unit 21 of the central processing unit 2 transmits a message on the acceptance of payment to the ATM 1, thereby executing the payment transaction processing (at step 93), followed by deletion of the advance transaction number 27a corresponding to the transaction currently under way, the scheduled starting day/time 27*b*, the scheduled finished day/time 27*c*, the transaction name 27*d* and the operation-procedure data 27*e* required for the current transaction from the reserved operation-procedure data 27 in the reserved operation-procedure data file (advance-registered file) 37 registered in the internal storage 22 (at step 94). On the other hand, when a reply of acceptance of the transaction from the central processing unit, the control unit 11 of the ATM 1 transmits such a reply to the account slip/card unit 14 which in turn prints out the items of the transaction on an itemized account slip (at step 90). And instructions are transmitted to the account slip/-card unit 14 to the effect that the data 26*a* (FIG. 3) indicative of validity/invalidity of the card, contained in the advance transaction registration data or information on the card inserted into the ATM, thereby having the account slip/card unit 14 overwrite the data 26*a* as invalid. Then, the card is returned to the user (at step 91). When the user receives the card and the itemized account slip discharged from the ATM, the control unit 11 gives instructions to a bank note paying-in/out unit 16 so as to pay out the bank notes equivalent of the amount of cash requested by the user of the card to draw out, followed by having the bank note paying-in/out unit 16 discharge the bank note to the user (at step 92).

As described hereinabove, the advance transaction processing method according to an embodiment of the present invention permits the transaction merely by having the user insert the card into the ATM by reading the advance transaction registration data or information registered in the internal storage of the central processing unit using the advance registration number recorded on the magnetic card on which the advance transaction registration data or information has been registered in advance as a key data for search and taking advantage of the transaction procedure data of the registered data or information.

In this embodiment, the input operation of the identification number is also used as registered data for the advance transaction, however, it is possible to check whether the user who inserted the card is identified as the actual owner of the card who has requested for the advance transaction by requesting the input of the identification number at the time of execution of the advance transaction from the viewpoint of protection. In this case, it may be checked whether the identification number inputted by the user of the card is identical to the identification number registered in the transaction procedure data transmitted from the central processing unit. This processing step for identification checking may be implemented, for example, between steps 85 and 86 after the data on the identification number has been transmitted from the central processing unit.

Description will now be made of other embodiments and variants according to the present invention.

Figure 8:
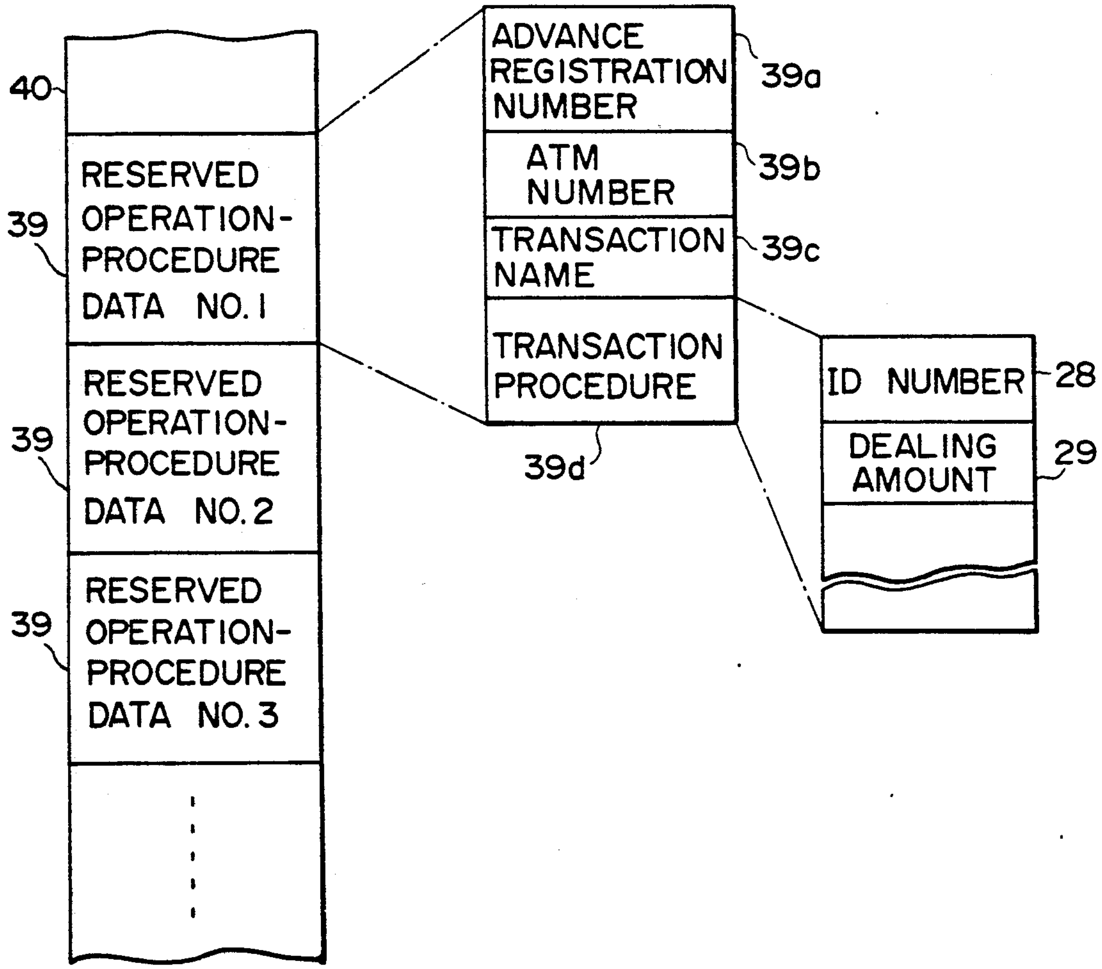
FIG. 8 is a diagrammatic representation showing another example of a data format for reserved transaction-operational procedure data on advance transaction registration data or information to be stored in the storage of the central processing unit in registering the advance transaction.

FIG. 8 is a diagrammatic representation of another example of a data format for the reserved transaction operation-procedure data for the advance transaction registration data or information to be stored in the storage of the central processing unit in executing the registration of the advance transaction. The reserved transaction operation-procedure data in this case is composed of the reserved transaction operation-procedure data 39 in a unit of each advance transaction, as shown in FIG. 8. Specifically, the reserved transaction operation-procedure data 39 comprises data on the advance registration number 39*a*, the ATM number 39*b*, the transaction name 39*c* and the transaction procedure 39*d*. The advance registration number 39*a* is the number to be determined at the time of the completion of the registration for the advance transaction and serves as data functioning as a key data for search of the advance transaction registration data or information. The ATM number 39*b* is data for distinguishing the particular ATM out of plural built-in ATMs, and the data can be used as a transaction restriction condition for the advance transaction. This data corresponds to the data on the scheduled starting and finished day/time for executing the advance transaction set in a predetermined range of the time period as the transaction restriction condition in the reserved operation-procedure data as shown in FIG. 4. The transaction name 39*c* is data indicative of the kind or content of the transaction. The data on the transaction procedure 39*d* contains the data on the identification number 28 and the amount of cash 29 to be transacted, in the same manner as in the previous case. The advance transaction registration data or information is constructed such that a plurality of the reserved operation-procedure data 39 is combined into the reserved operation-procedure data file 40 for the advance transaction registration data or information, in which each of the reserved operation-procedure data 39 is used as a unit of data for search.

Figure 9:
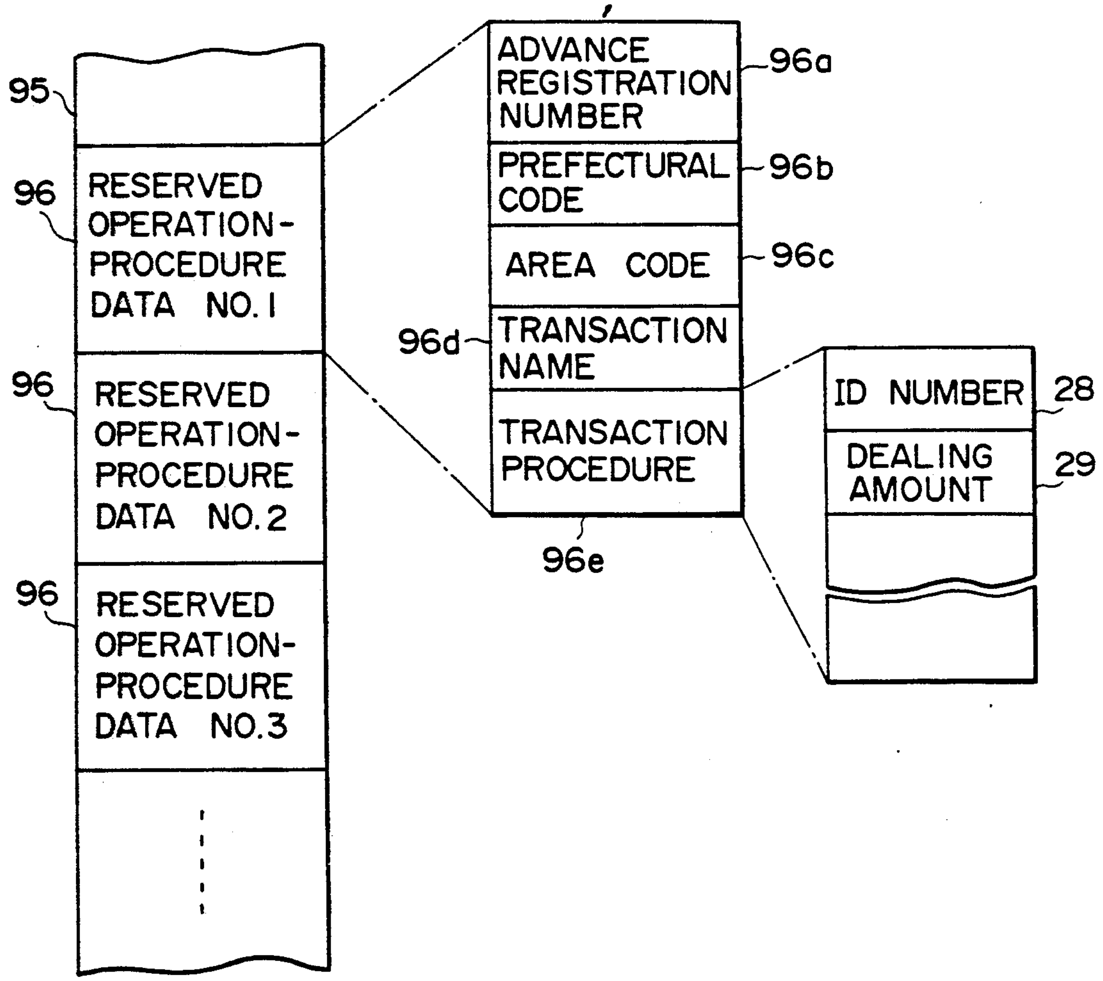
FIG. 9 is a diagrammatic representation showing a further example of a data format for reserved transaction-operational procedure data on advance transaction registration data or information to be stored in the storage of the central processing unit in registering the advance transaction.

FIG. 9 is a diagrammatic representation showing a further example of a data format for the reserved transaction operation-procedure data for the advance transaction registration data or information to be stored in the storage of the central processing unit in registering the advance transaction. As shown in FIG. 9, the advance transaction registration data or information in this case is composed of the reserved operation-procedure data 96 in a unit of each transaction to be stored in the reserved operation-procedure data file 95. The reserved transaction operation-procedure data 96 comprises data on the advance registration number 96*a*, the prefectural code 96*b*, the area code 96*c*, the transaction name 96*d* and transaction procedure 96*e*. The advance registration number 96*a* is the number to be determined at the time of the completion of the registration of the advance transaction and serves as a key data for searching the advance transaction registration data or information. The prefectural code 96*b* is data on the code indicative of the prefecture allocated exclusively to each prefecture in order to identify the prefecture in which the ATM is installed. The area code 96*c* is data on code indicative of the district allocated exclusively to the district of the prefecture in order to identify the district of the prefecture, in which the ATM is installed. The prefectural code 96*b* and the area code 96*c* are used as data for identification of the location at which plural ATMs are installed. This data may also be used as data for a transaction restriction condition of the advance transaction. This data corresponds to the data on the scheduled starting and finished day/time for the advance transaction to be executed in a predetermined period of time set as the transaction restriction condition in the embodiment as shown in FIG. 4 and the data on the ATM number set as the transaction restriction condition in the embodiment as shown in FIG. 8. The transaction's name 96*d* is data indicative of the kind or content of the transaction. The data on the transaction procedure 96*e* is data recording the procedure necessary for the advance transaction. The data on the transaction procedure 96*e* contains the identification number 28 and the payment amount 29 to be transacted in the same manner as in the previous cases as described hereinabove. The advance transaction registration data or information is comprised of an aggregate of a plurality of the reserved transaction operation-procedure data 96, which is combined into the reserved operation-procedure data file 95 for the advance transaction registration data or information, in which each of the reserved operation-procedure data 96 is used as a unit of data for search.

Figure 10:
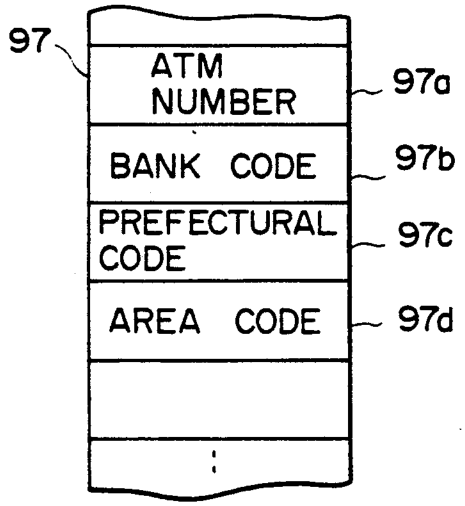
FIG. 10 is a diagrammatic representation showing a data format for identification data for identifying the ATM to be stored in the internal storage of the ATM.

FIG. 10 is a diagrammatic representation of an example of identification data for identifying the ATM to be stored in the internal storage of the ATM. As shown in FIG. 10, the identification data 97 for identifying the ATM is comprised of data on the ATM number 97*a*, the bank code 97*b*, the prefectural code 97*c*, the area code 97*d*, and so on. The ATM number 97*a* in the identification data 97 is numeral data allocated exclusively to each of the ATMs. The bank code 97*b* is data on the code indicative of the bank or banking organization in which the ATM is installed and the code being allocated exclusively to each of the banks or banking organization. The prefectural code 97*c* is data on the code allocated exclusively to each of the prefectures and the area code 97*d* is data on the code indicative of the district as one of areas into which the prefecture is divided, and the code being allocated exclusively to each of the districts. The data on the identification code 97 consisting of the data as described hereinabove can serve as identifying only one of the built-in ATMs.

The data on each element of the identification code set to identify each ATM can also be used as a transaction restriction condition for the advance transaction registration data or information in conducting the advance transaction. An example of the advance transaction registration data or information in this instance will be described.

Figure 11:
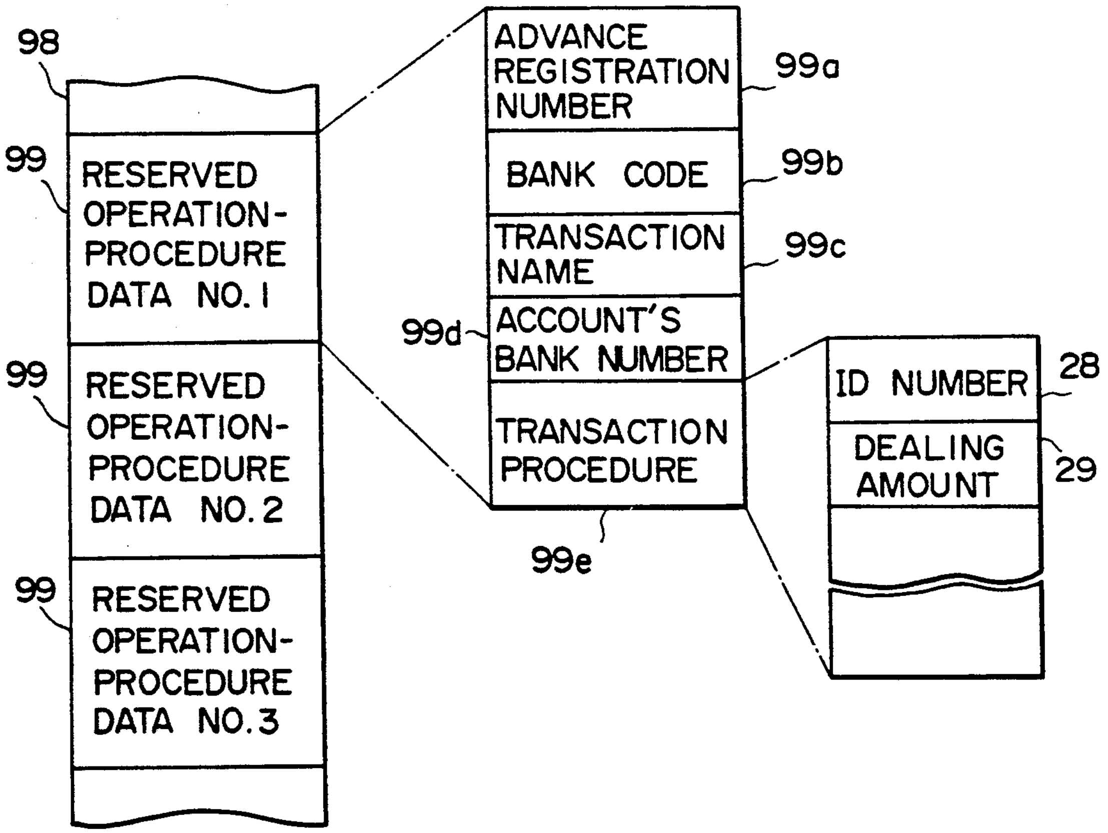
FIG. 11 is a diagrammatic representation showing a data format for reserved transaction-operational procedure data on advance transaction registration data or information to be stored in the storage of the central processing unit in registering the advance transaction.

FIG. 11 is a diagrammatic representation of another example of a data format for the reserved transaction operation-procedure data of the advance transaction registration data or information to be stored in the storage of the central processing unit in registering the advance transaction. The advance transaction registration data or information in this instance is comprised of the reserved transaction operation-procedure data 99 in a unit of each advance transaction to be stored in the reserved operation-procedure data file 98, as shown in FIG. 11. The reserved transaction operation-procedure data 99 comprises data on the advance registration number 99*a*, the bank code 99*b*, the transaction name 99*c*, the account's bank number 99*d* and transaction procedure 99*e*. The advance registration number 96*a* is the number to be determined at the time of the completion of the registration of the advance transaction and serves as a key data for searching the advance transaction registration data or information. The bank number 99*b* is data on the code indicative of the bank or banking organization allocated exclusively to each bank or relating organization in order to identify the bank or banking organization in which the ATM is installed. The data on the bank number 99*b* may be used as a transaction restriction condition for the advance transaction. The transaction name 99*c* is data indicative of the kind or content of the transaction. The account's bank number 99*d* is data on the account's bank indicative of the bank or banking organization at which the account for the advance transaction is opened. The data on the transaction procedure 99*d* is data recording the transaction operational procedure necessary for the advance transaction. The data on the transaction procedure 99*d* contains data on the identification number 28 and the payment amount 29 to be transacted in the same manner as in the previous cases as hereinabove described. The advance transaction registration data or information is comprised of an aggregate of a plurality of the reserved transaction operation-procedure data 99, which is combined into the reserved operation-procedure data file 98 for the advance transaction registration data or information, in which each of the reserved operation-procedure data 99 is used as a unit of data for search.

Description will now be made of processing examples for the advance transaction using the advance transaction registration data or information relating to other embodiments with reference to the accompanying drawings.

Figure 12:
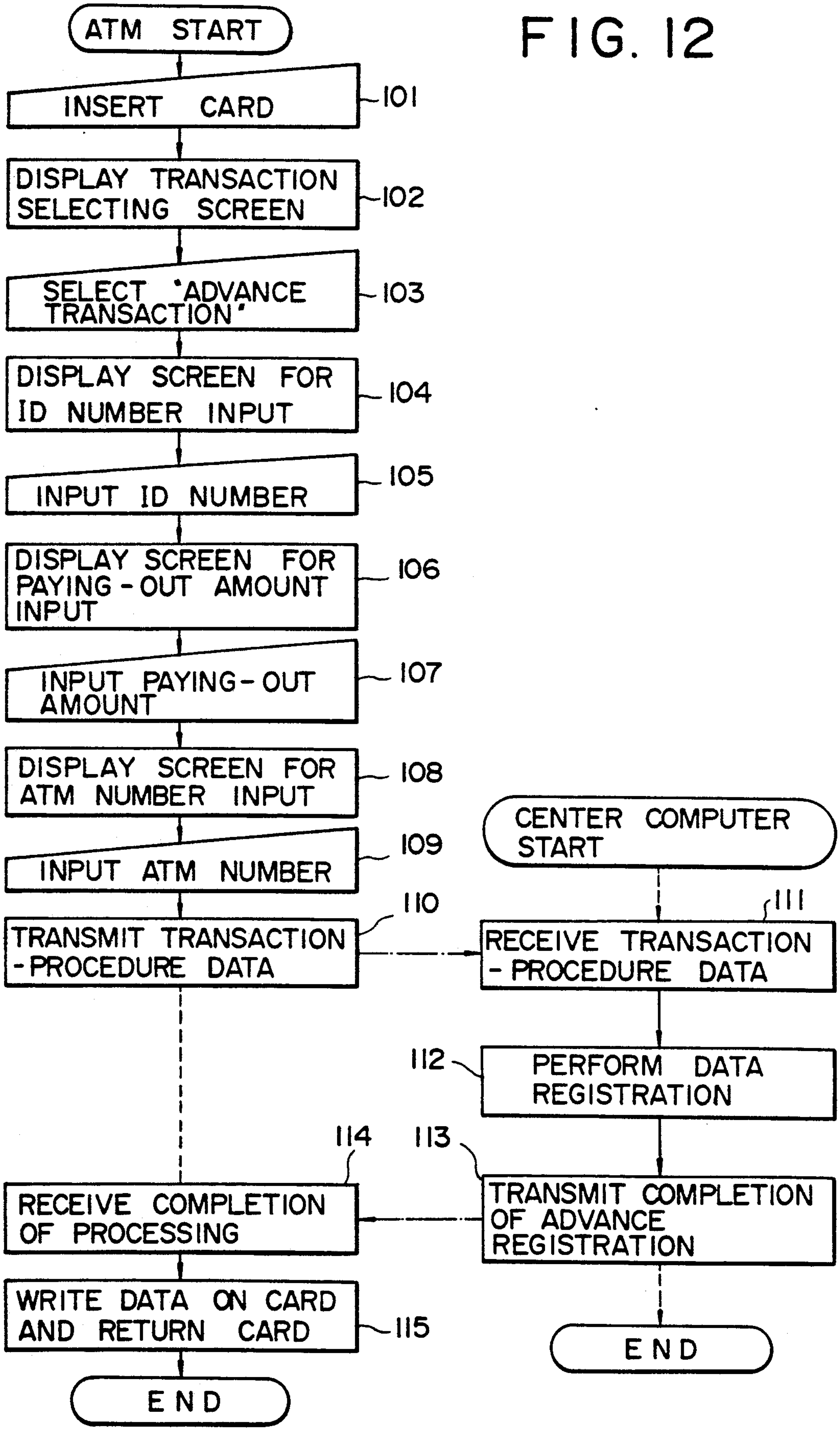
FIG. 12 is a flow chart showing an example of advance transaction registration processing in registering advance payment transaction by assigning the number of the ATM to be used for the advance transaction.
Figure 13A:
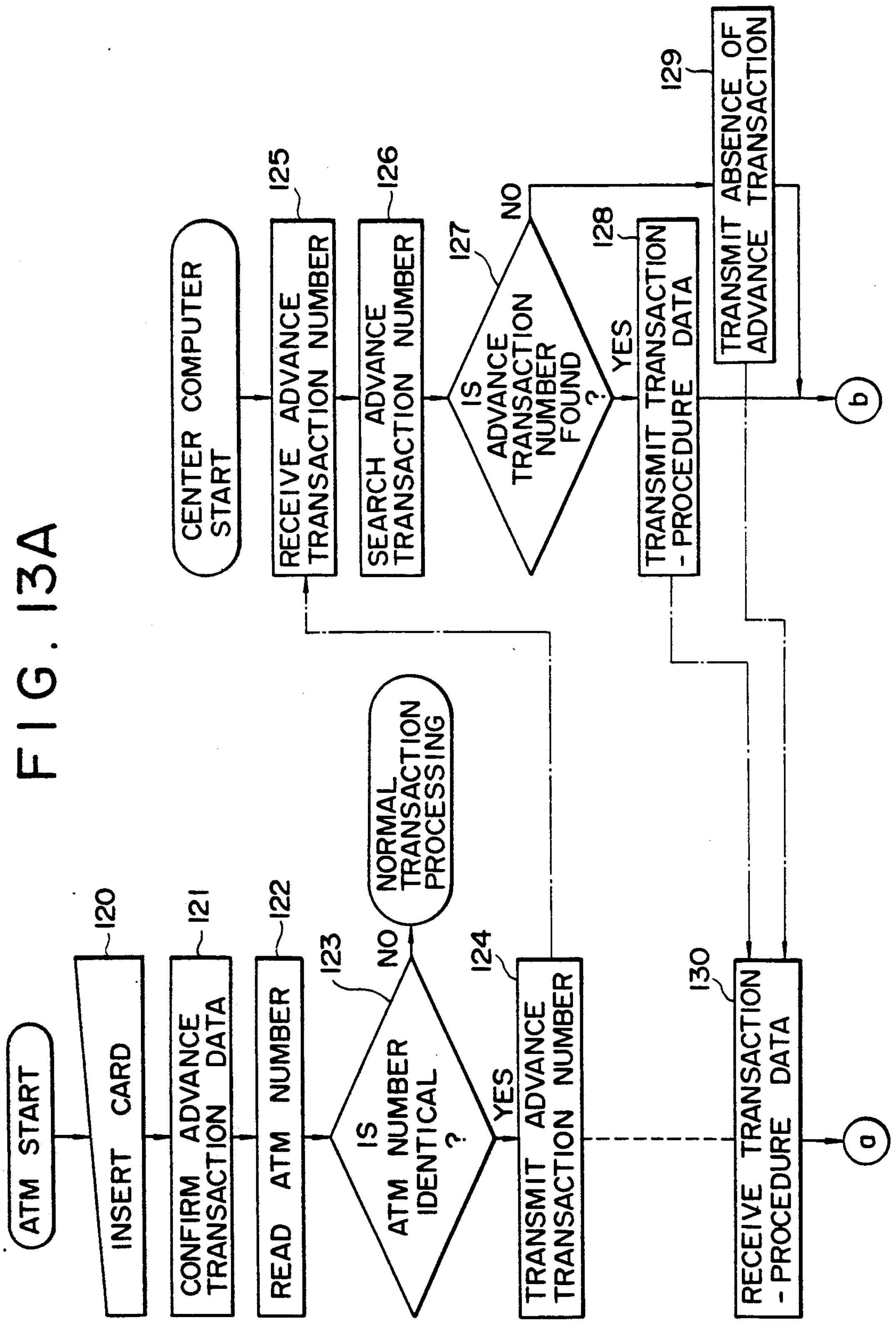
FIG. 13 (FIG. 13A and FIG. 13B) is a flow chart showing an example of advance transaction processing in executing the advance payment transaction through the ATM of the ATM number that is registered by the processing for registering the advance transaction of FIG. 12 so as to be assigned for payment transaction.
Figure 13B:
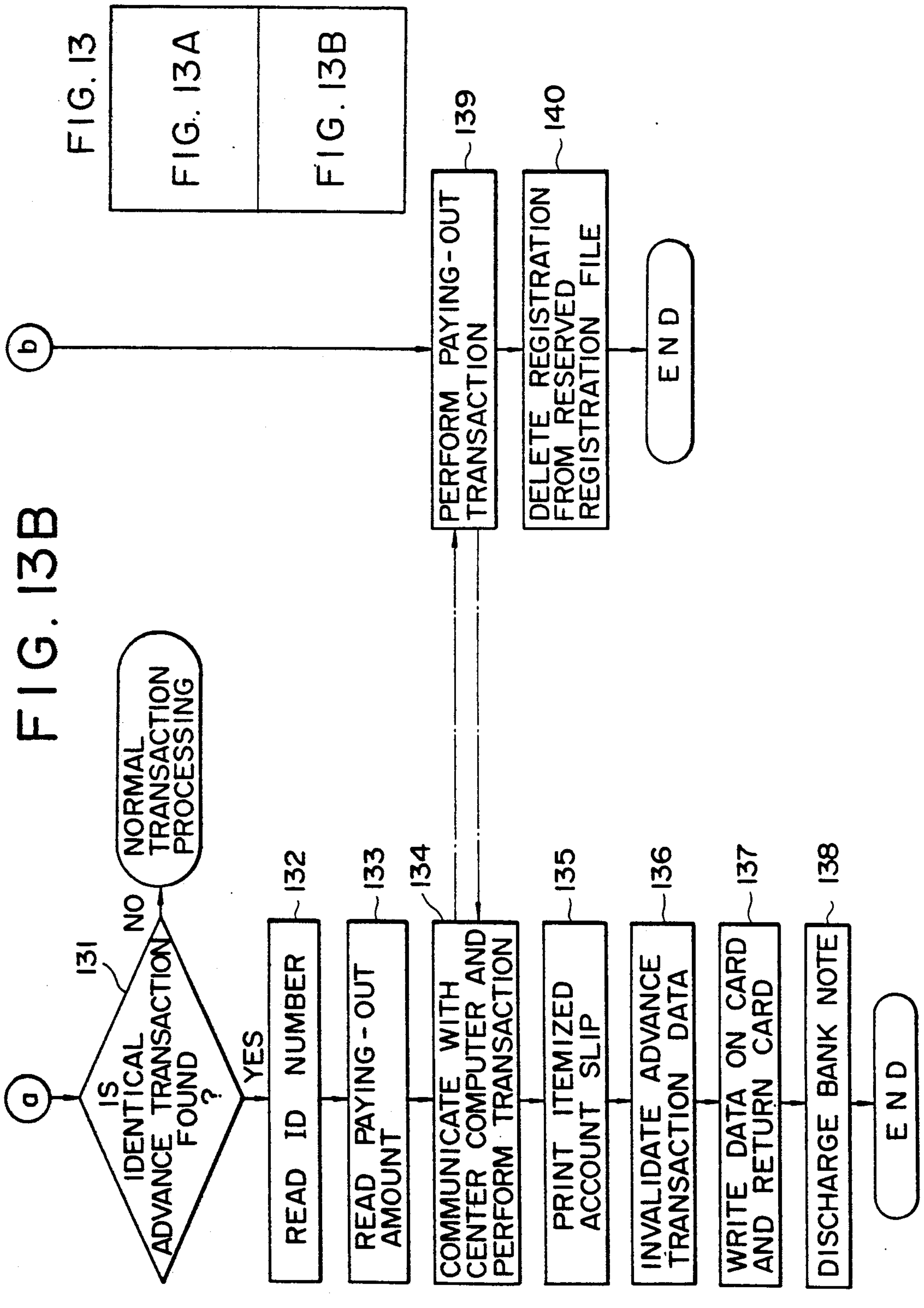

FIG. 12 is a flow chart showing an example of advance registration processing in registering an advance payment transaction by assigning the ATM number to be used for the advance transaction. FIG. 13 is a flow chart showing an example of advance transaction processing in executing through the ATM with the assigned ATM number the advance payment transaction registered in the advance transaction registration processing of FIG. 12.

Referring to FIG. 12, the advance transaction registration processing will first be described. First, at step 101, the user is requested to insert the card into the card inlet/outlet and itemized account slip outlet 1*a* in accordance with the operational guidance displayed on the touch input key and guidance display unit 1*b* of the ATM 1. Upon the insertion of the card, the program flow goes to step 102 at which the display on the screen of the touch input key and guidance display unit 1*b* is changed to the transaction selecting screen. On the transaction selecting screen, the user is requested to select the input of the item of transaction desired to be settled by the user. At step 103, in this embodiment, the user selects and inputs the item of transaction, i.e., "payment transaction", as the advance transaction. Upon the input of the item of the transaction, the screen on the touch input key and guidance display unit 1*b* is changed to the display for the input of the identification number at step 104, followed by step 105 at which the user inputs the identification number. The input of the identification number then changes the display on the screen to a display for the input of the payment amount requested by the user to draw out at step 106. Then, at step 107, the user inputs the payment amount to be paid out, and the program flow goes to step 108 at which a display for the input of the ATM number is made on the screen as a transaction restriction condition the user has set in advance for the advance transaction. Then, at step 109, the user inputs the ATM number of the ATM through which the user intends to settle the advance transaction.

The processing from step 104 to step 107 is the same as the transaction operational procedure in the normal payment transaction processing. At step 110, the procedure data inputted herein and the ATM number are transmitted as the transaction procedure data for the advance transaction to the central processing unit 2 of the center computer through the communication line 4*a* on the basis of the instructions from the control unit 11.

At the part of the center computer, on the one hand, when the transaction procedure data has been received (at step 111), the processing for the registration of the advance transaction registration data or information is implemented on the basis of the transaction procedure data transmitted (at step 112). When the data registration processing for the advance transaction registration data or information has been completed in a normal way, a message is transmitted to the ATM 1 to the effect that the advance registration has been finished (at step 113).

The processing at the part of the center computer involves transmitting the received data from the transmission control unit 24 of the central processing unit 2 to the control unit 21, allowing the control unit 21 to record the ATM number 39*b* the transaction name 39*c*, the identification number 28 and the payment amount 29 in the corresponding positions of the internal storage 22 as one of the reserved operation-procedure data 39, and finally recording a series of the advance registration number 39*a* managed as the advance transaction registration data or information, thereby completing the registration of the advance transaction. As the registration of the advance transaction has finished, the control unit 21 transmits to the transmission control unit 24 a message stating the completion of the advance transaction registration.

At the part of the ATM 1, on the other hand, when the message stating the completion of the advance transaction registration processing has been received (at step 114), the necessary data is written on the card and the card is then returned to the user (at step 115), thereby concluding a series of the processing for registering the advance transaction. In other words, when the control unit 11 of the ATM 1 receives the message on the completion of the processing at the part of the central processing unit 2 through the communication line 4*a* and the transmission control unit 1, the advance registration data indicative of the ATM number, the advance registration number and the valid advance transaction is transmitted to the account slip/card unit 14 which in turn writes the advance registration data transmitted thereto on a magnetic recording portion of the card, followed by the return of the card to the user.

Such a series of the operations and processing permits the registration of the content of the advance transaction and the ATM number of the ATM which executes the advance transaction, on both the card of the user and the storage of the central processing unit.

Description will now be made on the way of executing the transaction processing for the advance payment transaction subsequent to the registration of the advance transaction on the card of the user by assigning the ATM number of the ATM through which the advance transaction is to be executed.

The execution way will be described with reference to FIG. 13. At step 120, the user is requested to insert the card on which the advance transaction has already been registered into the card inlet/outlet and itemized account slip outlet 1*a* in accordance with the operational guidance indicated on the touch input key and guidance display unit 1*b* of the ATM 1. Upon insertion of the card, the program flow goes to step 121 at which the account slip/card unit 14 reads the data on the card and transmits the read data to the control unit 11 which in turn confirms as to whether the advance transaction data or information is registered on the card inserted. Then, at step 122, the ATM number 97*a* (FIG. 10) as part of the ATM identification data is read from the internal storage 17 of the ATM after the advance transaction data or information transmitted has been confirmed as valid. Thereafter, at step 123, a decision is made to determine if the ATM number 26*d* (FIG. 3) in the data on the card from which the ATM number ha been read out is identical to the data on the ATM number stored in the central processing unit. If the result of decision at step 123 indicates that the ATM number registered on the card is not identical to the ATM number stored in the central processing unit, on the one hand, then the program flow proceeds to a routine for processing the normal transaction. When the result of decision at step 123 indicates that the ATM number registered on the card is identical to the ATM number stored in the central processing unit, on the other hand, the control unit 11 gives the instructions to transmit the advance registration number to the transmission control unit 12 which in turn transmits the data on the advance registration number through the communication line 4*a* to the central processing unit 2 at step 124. Then, the central processing unit 2 receives the data on the advance registration number at step 125, followed by step 126 at which the data is transmitted to the control unit 21 of the central processing unit 2, which in turn searches the identification number identical to the one received from the reserved operation-procedure data 39 stored in the internal storage 22 of the central processing unit. Then, at step 127, a decision is made to determine the search result. If it is found that there is no identical advance registration number, on the one hand, the requested transaction is not regarded as the advance transaction and a message is transmitted at step 129 to the effect that there is no registered advance transaction. When the result of decision at step 127 indicates that there is the identical advance registration number, on the other hand, the program flow goes to step 128 at which the transaction procedure data 39*d* (FIG. 8) for the advance transaction is read out and transmitted to the ATM 1 through the transmission control unit 24 and the communication line 4*a*.

When the transmission control unit 12 of the ATM 1 has received the transaction procedure data transmitted from the central processing unit at step 130, the control unit 11 determines the presence or absence of the advance transaction from the result of the data received at step 131. When the message stating no advance transaction has been received, the requested transaction is transferred to the normal transaction processing. When the transaction procedure data has been received, the program flow goes to step 132 and the following steps at which the payment processing for paying cash out is executed in accordance with the transaction procedure data received.

The payment transaction is executed by reading the identification number from the received transaction procedure data for the advance transaction at step 132 and the payment amount to be transacted at step 133, and executing the transaction processing through communication with the central processing unit 2 about the payment transaction at step 134. When the center computer processes as to whether to accept the requested transaction at step 139 and the ATM 1 receives a reply from the central processing unit 2 at step 134 to the effect that the transaction has been accepted, the reply is transmitted to the account slip/card unit 14 which in turn prints out the particulars of transaction on an itemized account slip at step 135, followed by step 136 at which the advance transaction data or information is processed to be invalidated. In other words, the control unit 11 produces the instructions to the account slip/card unit 14 so as to overwrite the data 26*a* (FIG. 3) on the validity or invalidity contained in the advance transaction registration data or information on the card inserted. Then, at step 137, the account slip/card unit 14 writes the data on the card and returns the card to the user together with an itemized account slip on which particulars of the advance transaction are printed. Thereafter, the control unit 11 gives the instructions to the bank note paying-in/out unit 16 to pay out the payment amount requested to draw out by the user of the card, and the bank note paying-in/out unit 16 discharges the bank notes equivalent of the payment amount to be transacted at step 138. After the completion of the payment transaction processing at step 139, the central processing unit 2 deletes the data on the advance registration number 39*a* corresponding to the transaction currently in process, the ATM number 39*b*, the transaction name 39*c* and the transaction procedure 39*d* from the reserved operation-procedure data file 40 stored in the internal storage 22 of the central processing unit 2 at step 140.

As described hereinabove, in this embodiment, the advance transaction can be executed through the ATM with the ATM number identical to the ATM number registered in the advance transaction registration data or information recorded on the card inserted into the ATM by the user when the ATM number is assigned as the transaction restriction condition in the advance transaction registration data or information. With this arrangement, the user can execute the transaction only by inserting the card carried by the user into the ATM with the ATM number assigned for the advance transaction without additional operation of the ATM by taking advantage of the transaction procedure data for the advance transaction registered in advance in both the card and the central processing unit.

As have been described hereinabove, it is also possible to assign the prefecture/area at which the ATM is installed, without no particular ATM assigned, as the transaction restriction condition. With this arrangement for the system, the advance transaction can be executed through any ATM installed in the prefecture/area assigned as the transaction restriction condition. An example of the advance transaction processing in this instance will be described with reference to FIG. 14.

Figure 14:
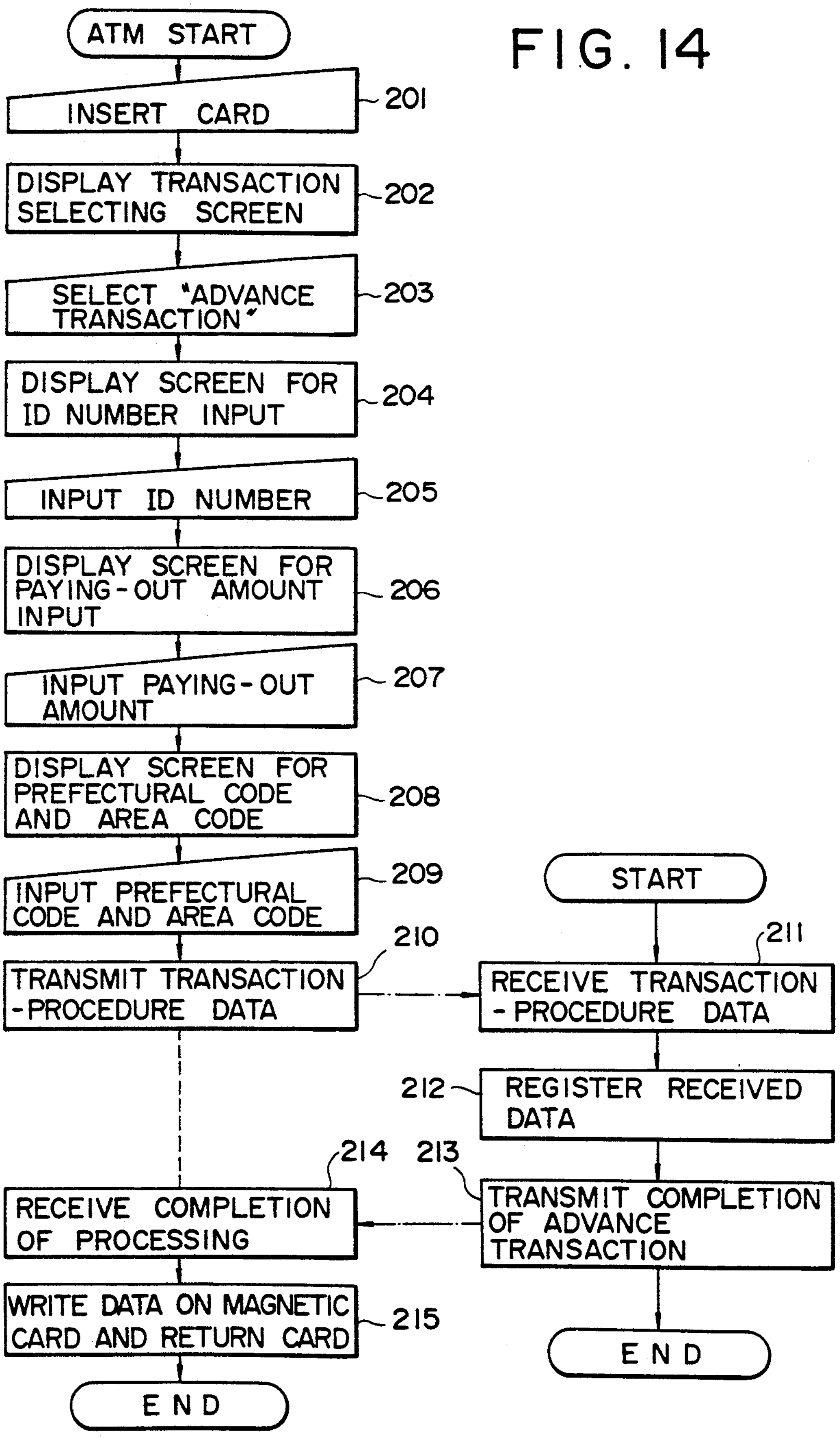
FIG. 14 is a flow chart showing an example of advance transaction registration processing in registering advance payment transaction so as to be executed by assigning a prefecture/area in which the ATM to be used for the advance transaction is installed.
Figure 15A:
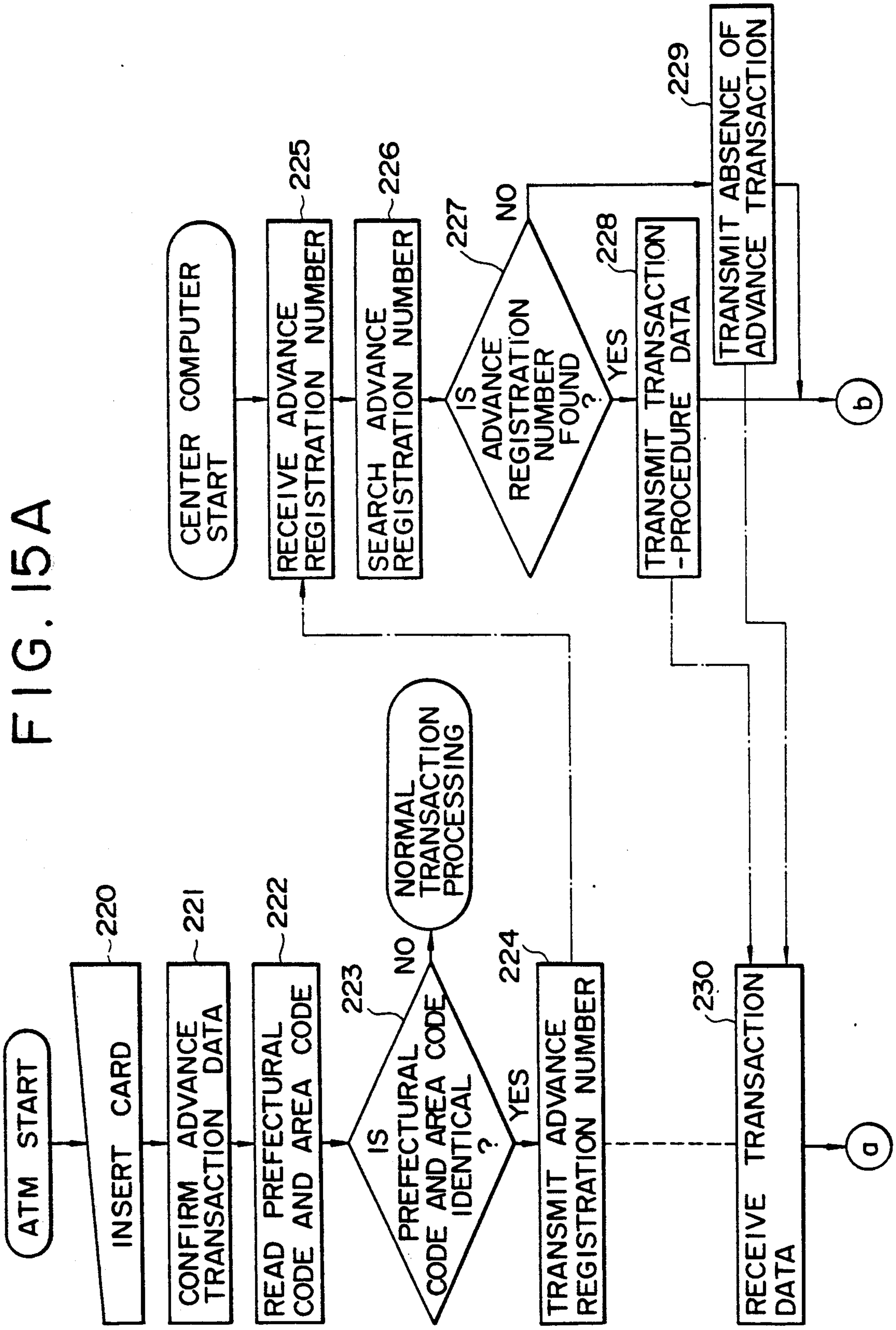
FIG. 15 (FIG. 15A and FIG. 15B) is a flow chart showing an example of advance transaction processing in executing the advance payment transaction through the ATM located in the prefecture/area, that is registered by the processing for registering the advance transaction of FIG. 14, so as to be assigned for the payment transaction.
Figure 15B:
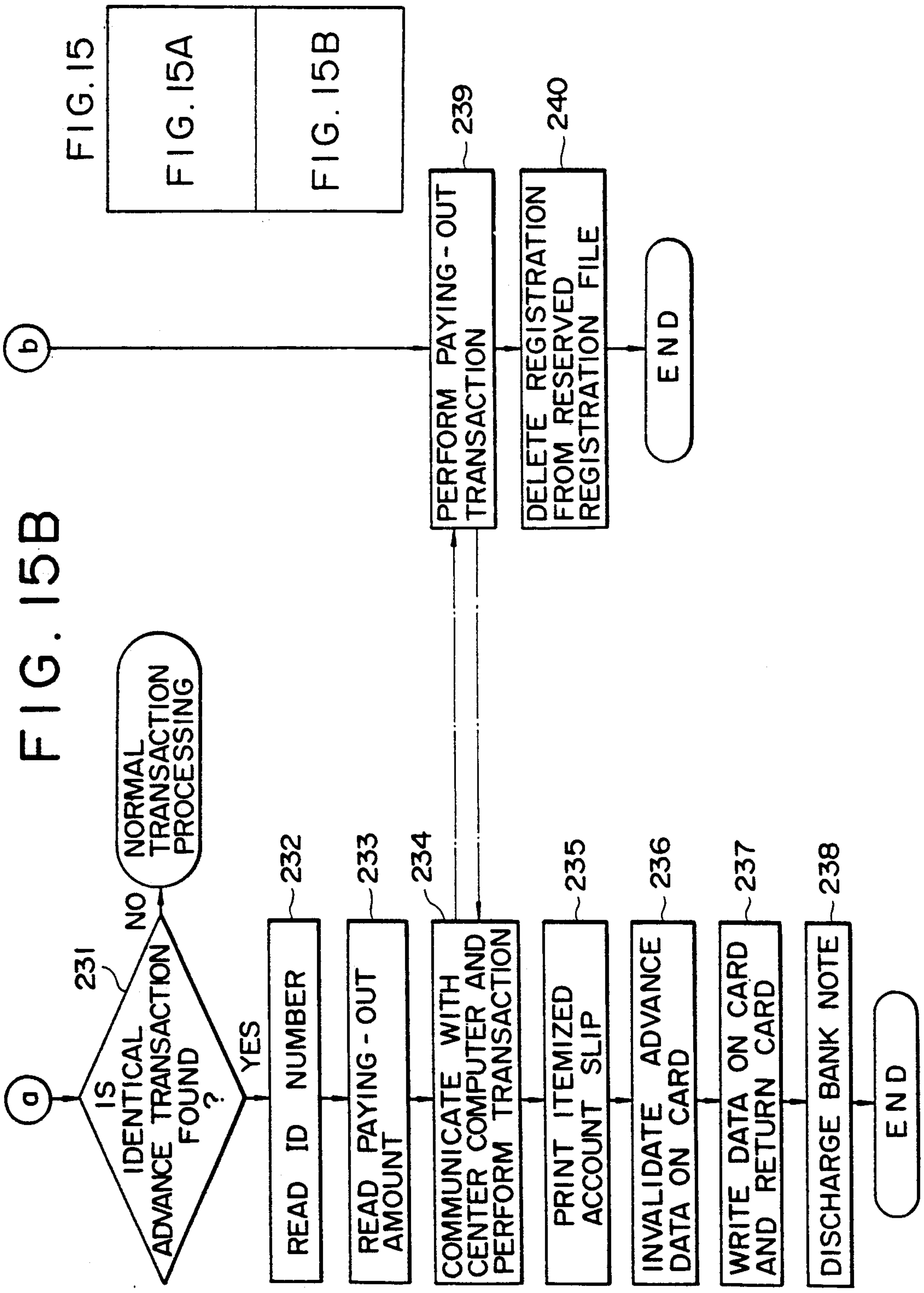

FIG. 14 is a flow chart showing an example of the advance registration processing in registering the advance payment transaction by assigning the prefecture/area in which the ATM intended to be used for the advance transaction is installed. FIG. 15 is a flow chart showing an example of the advance transaction processing to be executed by the ATM installed in the prefecture/area, which is assigned for the advance transaction registered so as to execute the advance transaction as shown in FIG. 14.

Referring to FIGS. 14 and 15, description will be made on the ways of registration processing for the advance payment transaction and of advance transaction processing after the registration of the advance payment transaction, in which the user operates the ATM and assigns the prefecture/area in which the ATM to be used for the registered advance transaction is installed.

Referring now to FIG. 14, the processing for registering the advance transaction will be described. First, at step 201, the user inserts the card into the card inlet/-outlet and itemized account slips outlet 1*a* of the ATM 1 in accordance with the operational guidance indicated on the touch input key and guidance display unit 1*b*. Upon insertion of the card into the ATM 1, the display on the screen of the touch input key and guidance display unit 1*b* has been changed to the screen for selecting transaction at step 202. Then, at step 203, the user is requested to input the item of transaction desired by the user on the transaction selecting screen and the user inputs the payment transaction from the items of transaction displayed on the screen. The input of the item of transaction changes the screen to a display for the input of the identification number on the screen of the touch input key and guidance display unit 1*b* at step 204, followed by step 205 at which the user inputs the identification number. Upon input of the identification number at step 205, the program flow goes to step 206 at which a display for the input of the payment amount to be transacted is made on the screen, followed by the input of the payment amount the user requests to draw out at step 207. Thereafter, at step 208, the screen is displayed for a request for the input of the prefectural code/the area code, in which the ATM intended by the user to execute the advance transaction is installed. Hence, at step 209, the user inputs the prefectural code/area code, each assigning the prefecture and the district of the prefecture, respectively, in which the ATM intended to execute the advance transaction is installed.

The processing from step 204 to step 207 is the same as the transaction operational procedure for the normal payment transaction. At step 210, the transaction procedure data containing the procedure data inputted by this operation and the prefectural code/area code are transmitted to the central processing unit 2 of the center computer. More specifically, the control unit 11 of the ATM 1 gives the instructions to the transmission control unit 12 to transmit the transaction procedure data and the transmission control unit 12 transmits the data to the central processing unit 2 of the center computer.

At the part of the center computer, when the central processing unit 2 has received the transaction procedure data from the ATM at step 211, the data registration processing for the advance transaction registration data or information is implemented on the basis of the transaction procedure data transmitted from the ATM at step 212. When the data registration for the advance transaction registration data or information has been completed in a normal way, then the program flow goes to step 213 at which a message is transmitted to the ATM to the effect that the registration of the advance transaction has been completed.

The processing at the part of the center computer involves allowing the transmission control unit 24 of the central processing unit 2 to transmit the received data to the control unit 21 thereof and allowing the control unit 21 to record the prefectural code 96*b*, the area code 96*c*, the transaction name 96*d*, the identification number 28 and the payment amount 29 to be transacted in the internal storage 22 of the central processing unit 2, as one of the reserved operation-procedure data 39 and, finally, a series of the advance registration numbers 96*a* managed as the advance transaction registration data or information, thereby completing the registration of the advance transaction. Upon the completion of the registration of the advance transaction, the control unit 21 has the transmission control unit 24 transmit a message stating the completion of the advance transaction.

At the part of the ATM 1, the message about the completion of the advance transaction has been received at step 214, followed by step 215 at which the data is written on the card and thereafter the card is returned to the user, thereby completing a series of the processing for the registration of the advance transaction. In other words, upon the receipt of the message on the completion of the advance transaction registration processing at the part of the central processing unit 2 through the communication line 4a and the transmission control unit 12, the control unit 11 of the ATM 1 transmits the advance transaction registration data, indicative of the prefectural code, the area code, the advance registration, and validity of the card, to the account slip/card unit 14 which in turn writes the advance transaction registration data transmitted on the magnetic data recording portion of the card inserted into the ATM, followed by the return of the card to the user.

Such a series of operations and processing enables the registration of the content of the advance transaction as well as the advance transaction on both the card and the storage of the central processing unit by assigning the prefecture/area in which the ATM intended to execute the advance transaction is installed.

Next, description will be made of the way of the user executing the transaction processing for the payment transaction registered for the advance transaction after the advance transaction has been registered on the card by assigning the prefecture/area in which the advance transaction is to be executed.

The way of executing the transaction processing will be described with reference to FIG. 15. In the processing flow as shown in FIG. 15, first, at step 220, the user inserts the card with the advance transaction registered thereon into the card inlet/outlet and itemized account slip outlet 1a in accordance with the operating guidance indicated on the touch input key and guidance display unit 1b of the ATM 1. As the card is inserted into the ATM, the program flow goes to step 221 at which the account slip/card unit 14 reads the data registered on the card and transmits the read data to the control unit 11 which in turn confirms as to the validity of the received advance transaction data or information on the card from the account slip/card unit 14. As the advance transaction data or information has been confirmed as valid at step 221, then the program flow proceeds to step 222 at which the prefectural code 97c and the area code 97d (FIG. 10) in which the ATM sought to execute the advance transaction is installed are read from the element data for the identification data on the ATM recorded in the internal storage 17 of the ATM. Then, at step 223, a decision is made to determine if the prefectural code 97c and the area code 97d of the ATM read from the ATM are identical, respectively, to the prefectural code 26e and the area code 26f (FIG. 3) of the advance transaction registration data read from the card inserted into the ATM. If the result of decision at step 223 indicates that the former is not identical to the latter, on the one hand, the requested transaction is not regarded as an advance transaction and it is transferred to a routine for the normal transaction processing. When the result of decision at step 223 indicates that the former is identical to the latter, on the other hand, the control unit 11 of the ATM 1 gives the instructions to the transmission control unit 12 so as to transmit the advance registration number, and the transmission control unit 12 transmits the advance registration number through the communication line 4a to the central processing unit 2 at step 224. At the part of the central processing unit 2, the transmission control unit 24 receives the advance registration number at step 225 and then transmits the advance registration number to the control unit 21 which in turn searches the advance registration number identical to the advance registration number received from the reserved operation-procedure data 39 recorded in the internal storage 22 at step 226. Then, at step 227, a decision is made to determine if the identical advance registration number has been found as a result of search. If the result of decision at step 227 indicates that no identical advance registration number has been found, the requested transaction is not regarded as advance transaction so that a message is transmitted to the ATM at step 229 to the effect that no identical advance registration number has been found. When the result of decision at step 227 indicates that the identical advance registration number has been found, the transaction procedure data 96e (FIG. 9) for the advance transaction is read and transmitted through the transmission control unit 24 and the communication line 4a to the ATM 1 at step 228.

At the part of the ATM 1, the transmission control unit 12 receives the transmitted data at step 230, and the control unit 11 makes a decision from the result of receipt of the data so as to determine if the data on the advance transaction is located, at step 231. If the message has been received to the effect that there is no advance transaction, then the requested transaction is transferred for the normal transaction processing. When the transaction procedure data has been received, the payment transaction for paying bank notes out will be executed in the following manner in accordance with the transaction procedure data received.

The execution of the payment transaction may be implemented by first reading the identification number from the received transaction procedure data for the advance transaction at step 232, followed by step 233 at which the payment amount to be transacted is read. Then, at step 234, the ATM is communicated with the central processing unit 2 as to the payment transaction and the transaction processing is executed. On the other hand, the central processing unit 2 of the center computer executes the payment transaction processing at step 239. And when a reply is received from the central processing unit 2 of the center computer to the effect that the transaction has been accepted, the reply is transmitted to the account slip/card unit 14 which in turn prints items of the transaction on an itemized account slip at step 235, and advance data or information is invalidated at step 236. The invalidation processing for the advance data or information is executed by having the control unit 11 give the instructions to the account slip/card unit 14 so as to overwrite the valid/invalid data 26a (FIG. 3) contained in the advance transaction registration data or information on the card inserted into the ATM so as to become invalid. Then, at step 237, the account slip/card unit 14 is allowed to write the data on the card and return the card to the user, together with the itemized account slip printed out previously. When the user has received the card and the itemized account slip, then the control unit 11 produces the instructions to the bank note paying-in/out unit 16 so as to pay out the payment amount to be transacted, thereby discharging the bank notes equivalent of the payment amount to the user at step 238, thereby concluding the processing on the side of the ATM.

At the part of the central processing unit 2, after the processing for the payment transaction has been completed at step 239, the data on the advance registration number corresponding to the transaction currently in process, the prefectural code 96b, the area code 96c, the transaction name 96*d* and the transaction procedure 96*e* are deleted from the reserved operation-procedure data file 95 stored in the internal storage 22 of the central processing unit 2 at step 240, thereby finishing the processing at the part of the center computer.

In the embodiment as described hereinabove, the prefectural code/area code in which the ATM is installed, are assigned as the transaction restriction condition in the advance transaction registration data or information, so that the advance transaction can be executed only by the ATM with the prefectural code/area code as the identification data in the advance transaction registration data recorded on the card. With this arrangement, the user can execute the advance transaction only by inserting the card concerned into the ATM installed in the prefecture/area assigned for the advance transaction, without special operation at the part of the user by taking advantage of the transaction procedure data or information for the advance transaction recorded in both the card and the central processing unit.

In registering the payment transaction as the advance transaction or in executing the advance transaction, it is to be noted that the account to be transacted as the advance transaction may be an account of the different bank or banking organization. In this case, however, the processing for registering the advance transaction or the processing for executing the advance transaction may be implemented by transferring a telegraphic transaction communication from the center computer of the bank in which the ATM to be operated is installed to a central processing unit of a center computer in the other bank or banking organization.

Figure 16:
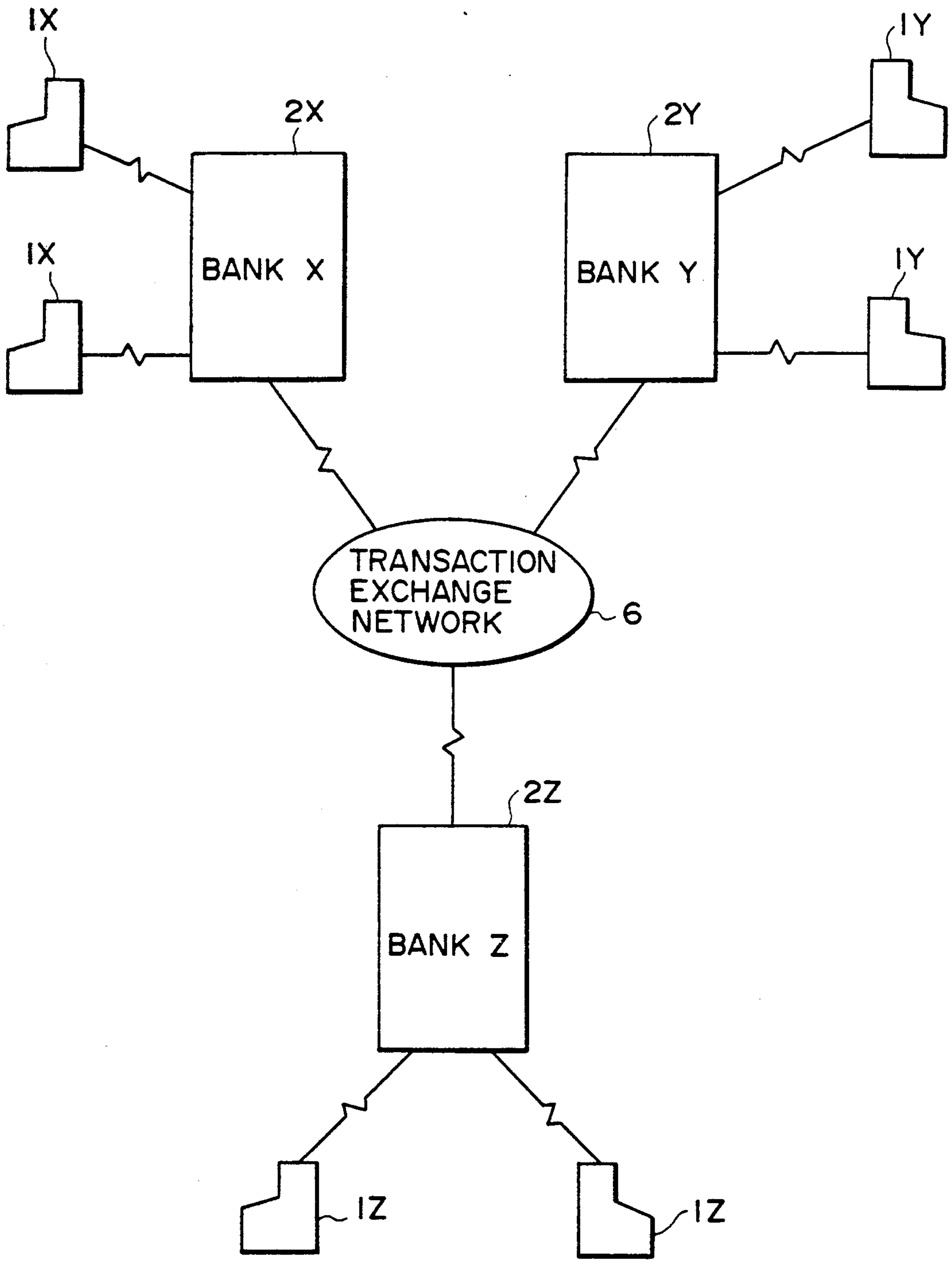
FIG. 16 is a block diagram showing the construction of a network system for exchanging transaction, which is interconnected among banks or other banking organizations through a transaction exchanging network.

FIG. 16 is a block diagram showing a transaction exchanging network system in which each of the banks or banking organizations are interconnected to each other through a transaction exchanging network. As shown in FIG. 16, reference alphanumeral 2X denotes a center computer of a bank X, reference alphanumeral 2Y denotes a center computer of a bank Y, and reference alphanumeral 2Z denotes a center computer of a bank Z. Further, as shown in FIG. 16, reference alphanumeral 1X denotes an ATM of the bank X, reference alphanumeral 1Y denotes an ATM of the bank Y, and reference alphanumeral 1Z denotes an ATM of the bank Z. The center computer 2X of the bank X, the center computer 2Y of the bank Y and the center computer 2Z of the bank Z are interconnected to each other through a transaction exchanging network 6, thereby enabling an interconnection of plural banks and banking organizations and constituting a transaction exchange network system. The center computer of each bank or banking organization contains the central processing unit for implementing transaction processing, to which ATMs and teller terminal units are connected. The construction of such a transaction exchange network system permits execution of the transaction processing by transferring a telegraphic transaction communication from the ATM to be operated by the user to the other bank or banking organization through the transaction exchanging network 6 in conducting transaction with a transaction account opened in the other bank or banking organization from the ATM connected to the self central processing unit among the banks and banking organizations.

Description will now be made of an example of the advance transaction processing to be implemented from an arbitrary ATM connected to such a transaction exchanging network by assigning the bank or banking organization in which the transaction account is opened.

Figure 17A:
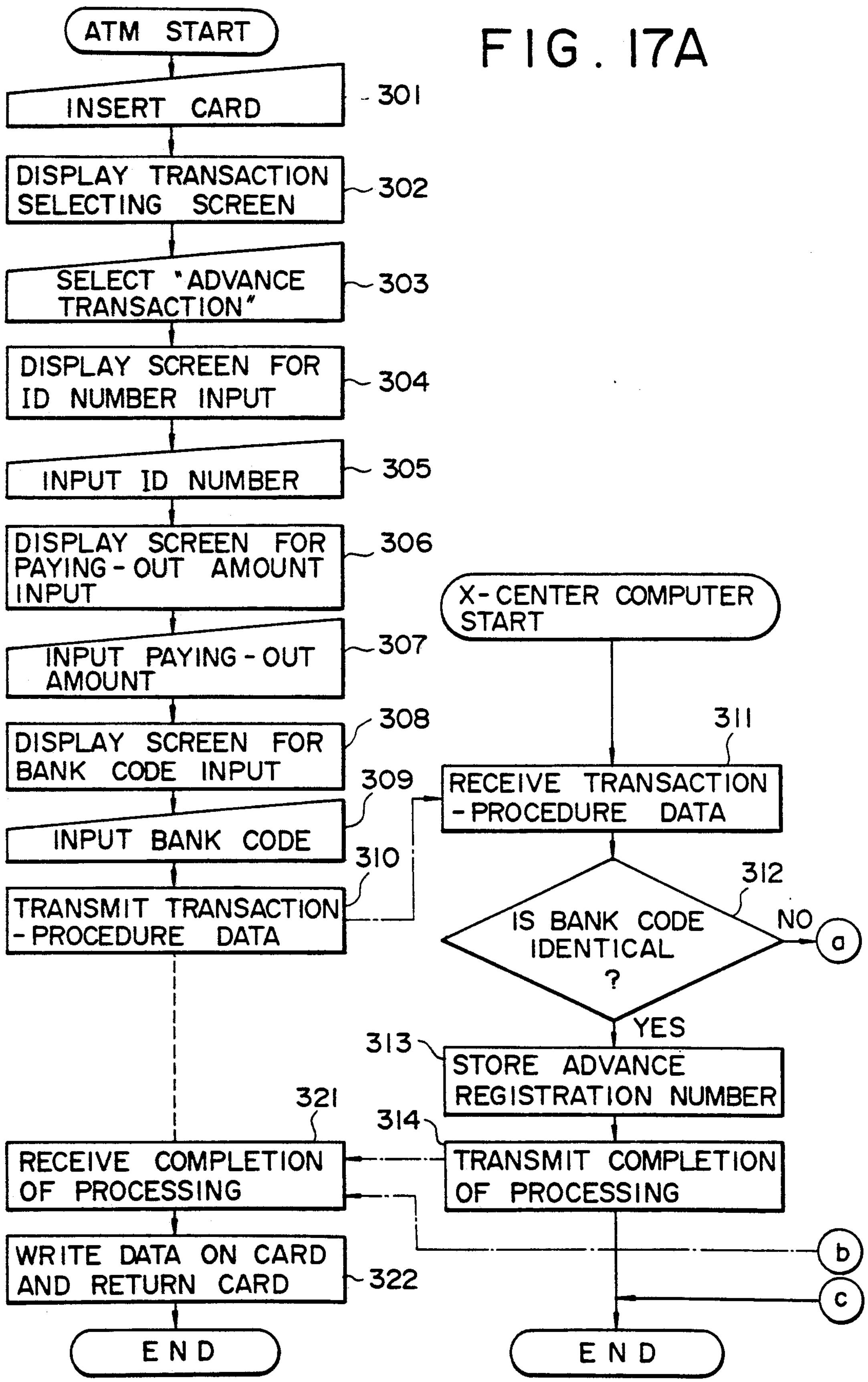
FIG. 17 (FIG. 17A and FIG. 17B) is a flow chart showing an example of advance transaction registration processing for registering advance transaction for payment transaction by assigning the bank or other banking organization to be used for the advance transaction.
Figure 18B:
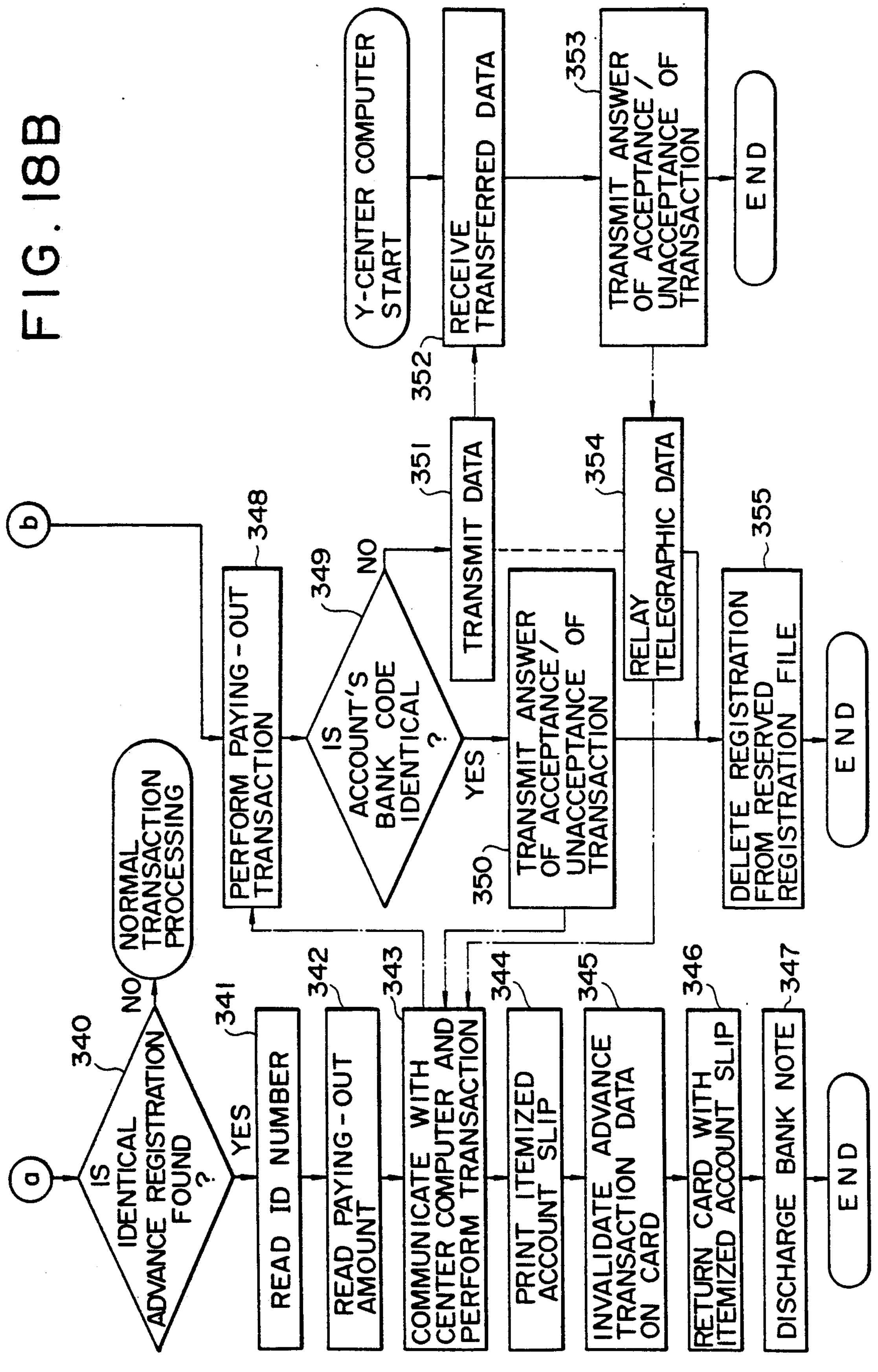
FIG. 18 (FIG. 18A and FIG. 18B) is a flow chart showing an example of advance transaction processing in executing advance payment transaction registered by the processing of advance transactions registration of FIG. 17 through the bank or the banking organization assigned.

FIG. 17 is a flow chart showing an example of the advance transaction processing for registering the advance payment transaction by assigning the bank or banking organization to be used for the advance transaction. FIG. 18 is a flow chart showing an example of the advance transaction processing in executing the payment transaction registered in the registration processing for the advance transaction, as shown in FIG. 17, at the assigned bank or banking organization.

Description will now be made of the registration processing for the advance transaction in conjunction with FIG. 17.

First, at step 301, the user inserts the card into the card inlet/outlet and itemized account slip outlet 1*a* of the ATM 1 in accordance with the operating guidance indicated on the touch input key and guidance display unit 1*b* of the ATM 1. Upon insertion of the card into the ATM, the display on the screen of the touch input key and guidance display unit 1*b* is changed to the transaction selecting screen at step 302. Then, at step 303, the user selects the item of transaction sought to be settled by the user on the screen display and inputs the payment transaction of the advance transaction, followed by step 304 at which the display on the screen has been changed to a display for a request for the input of the identification number on the screen of the touch input key and guidance display unit 1*b*. The program flow then goes to step 305 at which the identification number is inputted, followed by step 306 at which a display for the input of the payment amount to be transacted appears. Then, at step 307, the payment amount sought to be transacted by the user is inputted. Following step 307, the display on the screen is changed at step 308 to a display for the input of the bank code assigned as the bank or banking organization, in which the advance transaction is intended to be executed, as a transaction restriction condition for the advance transaction. Then, at step 309, the user inputs the bank code for the bank or banking organization where the advance transaction is intended to be executed.

The processing from step 304 to step 307 is the same as the transaction operational procedure in the normal transaction processing. Then, at step 310, the transaction-procedure data containing the procedure data inputted by this operation and the transaction procedure data for registering the advance transaction are transmitted to the central processing unit of the center computer 2X of the bank X. The processing for this transmission is such that the control unit 11 gives the instructions to the transmission control unit 12 so as to transmit the transaction procedure data, and the transmission control unit 12 transmits the transaction procedure data to the central processing unit of the center computer 2X of the bank or banking organization X through the communication line 4*a*.

At the part of the center computer 2X, upon receipt of the transaction procedure data at step 311, then a decision is made to determine at step 312 if the bank code of the data transmitted is identical to the bank code of the center computer 2X. When the result of decision at step 312 indicates that the bank code in the transaction procedure data transmitted is identical to the self bank code, then the program flow proceeds to step 313 at which the processing is implemented for the data registration of the advance transaction registration data or information on the basis of the transaction procedure data transmitted and the advance registration number accompanying the registration processing is recorded. As the advance registration number has been registered and the data registration of the advance transaction registration data or information has been completed in a normal way, then the program flow goes to step 314 at which a message is transmitted to the ATM to the effect that the registration processing of the advance transaction has been completed.

The registration processing at the part of the center computer 2X is implemented by allowing the transmission control unit 24 of the central processing unit to transmit the received data to the control unit 21, and allowing the control unit 21 to record the bank code *99b*, the transaction name *99c*, the account's bank number *99d*, the identification number 28 and the payment amount 29 to be transacted in the respectively corresponding positions in the internal storage 22, for example, as one of the reserved operation-procedure data 99 (FIG. 11) and, finally, a series of the advance registration number *99a* managed as the advance transaction registration data or information, thereby completing the registration of the advance transaction. As the registration of the advance transaction has been completed, the control unit 21 transmits a message to the transmission control unit 24 to the effect that the advance transaction registration has been completed.

On the other hand, if the result of decision at step 312 indicates that the bank code transmitted is not determined to be identical to the self bank code, the requested transaction is regarded as advance transaction with a transaction account opened at another bank or banking organization so that the transaction procedure code received is further transmitted through the transaction exchanging network 6 to the central processing unit of the center computer 2Y of the corresponding another bank or banking organization at step 315. As the transaction procedure data transmitted has been received by the central processing unit of the center computer 2Y at step 316, the program flow proceeds to step 317 at which the processing for registering the advance transaction is implemented in the same manner as at step 313 and the advance registration number is stored. Upon the completion of the registration processing of the advance transaction, then the central processing unit of the center computer 2Y of the bank or banking organization Y transmits at step 318 a message stating the completion of the registration processing of the advance transaction through the transaction exchanging network 6 to the center computer 2X of the bank or banking organization X from which the transaction procedure data has been received. As the central processing unit of the center computer 2X has received the data from the central processing unit of the center computer 2Y at step 319, the former transmits the received data as it was at step 320, thereby relaying the data to the ATM.

The ATM receives the data stating the completion of the registration processing of the advance transaction at step 321, followed by step 322 at which the data is written on the card inserted into the ATM and then the card is returned to the user. This concludes a series of the registration processing of the advance transaction. More specifically, as the central processing unit has received the message stating the completion of the registration processing through the communication line *4a* and the transmission control unit 12, the control unit 11 of the ATM transmits the data on the bank code, the advance registration number and the advance registration data indicative of the validity of the advance transaction to the account slip/card unit 14 which in turn writes the transmitted advance registration data on the magnetic data recording portion of the card inserted into the ATM and discharges and returns the card to the user.

Such a series of the operations and processing makes the records of both the advance registration data or information on the card of the user and the advance registration data or information in the storage of the central processing unit, thereby enabling the registration of the advance transaction so as to be executed at the bank or banking organization assigned by the user to settle the advance transaction. It is also noted that the assignment of the bank or banking organization at which the advance transaction is to be executed can be implemented at a bank or banking organization other than the bank or banking organization in which the ATM through which the processing for registering the advance transaction has been implemented is installed, thereby enabling the execution of the desired advance transaction at the bank or banking organization other than that at which the registration processing of the advance transaction was implemented. Further, a request for the execution of the registration processing for the advance transaction may be made between the banks or banking organizations concerned through the transaction exchanging network 6.

The following is description of an example of transaction processing when the user executes the advance payment transaction after the registration of the advance transaction was registered on the card.

Referring to FIG. 18, the user inserts the card with the advance transaction registered thereon into the card inlet/outlet and itemized account slip outlet *1a* in accordance with the operating guidance indicated on the touch input key and guidance display unit *1b* of the ATM 1 at step 330. Upon insertion of the card, the program flow proceeds to step 331 at which the account slip/card unit 14 reads the data on the card and transmits to the control unit 11 which in turn confirms the advance transaction data or information on the card transmitted from the account slip/card unit 14. As the advance transaction data or information has been confirmed as valid, the program flow goes to step 332 at which the self bank code *97b* (FIG. 10) is read from the identification data on the ATM recorded in the internal storage 17 of the ATM, followed by step 333 at which a decision is made to determine if the bank code of the ATM read from the identification data on the ATM is identical to the bank code *26g* (FIG. 3) of the advance transaction registration data or information read from the card. If it is decided at step 333 that the self bank code *97b* is not identical to the bank code *26g*, the requested transaction is judged as being no advance transaction and transferred for normal transaction processing. When the result of decision at step 333 indicates that the self bank code *97b* is identical to the bank code *26g*, the control unit 11 gives the instructions to the transmission control unit 12 so as to transmit the advance registration number and the transmission control unit 12 transmits the advance registration number to the central processing unit 2 of the center computer 2X of the bank or banking organization X through the communication line *4a* at step 334. The central processing unit 2 of the center computer 2X receives the advance registration number at the transmission control unit 24

(at step 335) which in turn transmits the advance registration number to the control unit 21. Then, at step 336, the control unit 21 searches the advance registration number identical to that received from the reserved operation-procedure data 39 stored in the internal storage 22, thereby making a decision to determine if the advance registration number received is identical to the advance registration number searched from the data in the internal storage. If the result of decision at step 336 indicates that there is no identical advance registration number, the requested transaction is not judged as advance transaction so that a message is transmitted to the ATM to the effect that there is no advance transaction at step 338. When the result of decision at step 336 indicates that there is the identical advance registration number, then the program flow goes to step 337 at which the transaction procedure data 99*e* (FIG. 11) for the advance transaction is read out and transmitted through the transmission control unit 24 and the communication line 4*a* to the ATM.

At the part of the ATM, the transmission control unit 12 receives the data transmitted from the central processing unit at step 339, and the control unit 11 makes a decision to determine from the result of the received data at step 340 if the advance transaction has already been registered. If the message stating the absence of the advance transaction has already been received, on the one hand, the requested transaction is transferred to a routine for the normal transaction processing. When the transaction procedure data has already been received, the advance payment transaction is executed in accordance with the transaction procedure data in such a manner as will be described hereinafter.

In the execution of the advance payment transaction, the identification number is first read out from the received transaction procedure data for the advance transaction (at step 341) and the payment amount to be transacted is read out (at step 342), followed by the execution of the transaction processing by means of a communication about the advance payment transaction with the central processing unit (at step 343). The central processing unit at the part of the center computer, on the other hand, the processing for the advance payment transaction is executed at step 348.

When the ATM has received a message stating acceptance of the advance transaction from the central processing unit of the center computer, the message is transmitted to the account slip/card unit 14 which in turn prints items and particulars of the transaction on an itemized account slip at step 344. Then, the program flow goes to step 345 at which the advance data or information is rendered invalid. This invalidation processing is executed by allowing the control unit 11 to give instructions to the account slip/card unit 14 so as to overwrite the data 26*a* (FIG. 3), indicative of the validity or validity of the advance transaction registration data or information registered on the card inserted into the ATM, and allowing the account slip/card unit 14 to overwrite the data on the card, followed by the return of the card together with the itemized account slip. Upon the receipt of the card and the itemized account slip by the user, then the control unit 11 gives the instructions on the payment amount to the bank note paying-in/out unit 16 which in turn pays out the bank notes equivalent of the payment amount as requested by the user at step 347.

At the part of the central processing unit, when the advance payment transaction has been processed as a result of communication with the central processing unit from the ATM at step 348, then a decision is made to determine at step 349 if the account's bank number 99*d* stored in the reserved operation-procedure data 99 is identical to the self account's bank number. When the result of decision at step 349 indicates that the account's bank number 99*d* is identical to and is found to correspond to the self account's bank number, then the program flow goes to step 350 at which a message is transmitted to the ATM to the effect that the requested transaction is accepted or unaccepted. If it is decided at step 349 that the account's bank number 99*d* is not identical to the self account's bank number and that the account requested to execute the advance payment transaction is an account of another bank, the transaction procedure data is transmitted through the transaction exchanging network 6 to the corresponding other bank or banking organization at step 351. More specifically, the payment processing is requested by transferring a telegraphic transaction communication to the central processing unit of the bank or banking organization in which the account requested to implement the advance payment transaction is opened. When the telegraphic transaction communication o the transaction procedure data has been received at step 352, the central processing unit of the other bank or banking organization requested to implement the payment processing executes processing similar to that at step 350. As the other bank or banking organization has implemented the payment transaction, a reply stating acceptance or unacceptance of the requested payment transaction is transmitted to the central processing unit of the bank or banking organization who has requested the advance payment transaction, at step 353. On the other hand, upon receipt of the reply from the central processing unit at the part of a requestee, the central processing unit at the part of a requestor relays the reply stating the acceptance or unacceptance of the requested advance payment transaction to the ATM at step 354.

When the ATM has received the reply of acceptance of the requested advance payment transaction, then the control unit 11 of the ATM, transmits the data to that effect to the account slip/card unit 14 which in turn prints items and particulars of the transaction out on an itemized account slip at step 344, and the data indicative of the validity or invalidity contained in the advance transaction registration data or information on the card inserted into the ATM is invalidated at step 345. Thereafter, the invalidated data is overwritten on the card, followed by the return of the resulting card to the user, together with the itemized account slip, at step 346. Upon the receipt of the card and the itemized account slip by the user, the control unit 11 gives the instructions to the bank note paying-in/out unit 16 so as to pay out the cash equivalent of the payment amount requested to be transacted by the user, and the bank note paying-in/out unit 16 discharges the amount of cash to the user, at step 347.

The central processing unit at the part of the ATM which has executed the payment transaction deletes the data on the advance registration number 99*a*, the bank code 99*b*, the transaction name 99*c*, the account's bank number 99*d*, and the operation procedure 99*e* of the reserved operation-procedure data 99, corresponding to the transaction currently in processing, from the reserved operation-procedure data file 98 at step 355, thereby completing the execution of a series of the advance transaction processing.

A series of such operations and processing permits the payment transaction only by requesting the user to insert the card carried by the user into the ATM of the bank or banking organization assigned on the card on the basis of the transaction procedure data or information in which the bank or banking organization is assigned so as to settle the advance transaction and which is registered on both the card and the central processing unit.

In this embodiment as described hereinabove, the advance registration data or information is registered on both the card of the user and the storage of the central processing unit and the registration of the advance transaction is made by assigning the bank or banking organization at which the advance transaction is to be settled, so that the user can execute the advance payment transaction only by inserting the card into the ATM of the bank or banking organization assigned on the basis of the transaction procedure data or information registered in advance. It is also noted that a request for the execution of the registration processing for the advance transaction may be made between banks or banking organizations through the transaction exchanging network 6.

In each of the above embodiments, the description has been made by taking as an example a card with a magnetic stripe portion to be used for the registration for the advance transaction. It is to be noted, however, that the card to be used for the present invention is not restricted to such a magnetic card, and IC cards with a semiconductor memory or microprocessor embedded therein may also be used.

Figure 19:
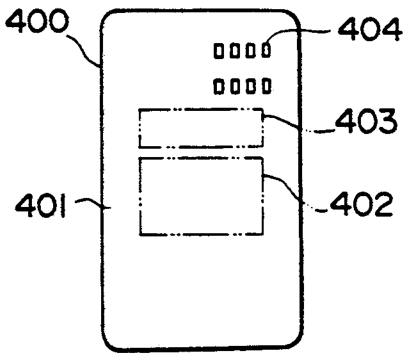
FIG. 19 is a diagrammatic representation of an outlook of an IC card to be used by the ATM.

The following is description of an embodiment of the advance transaction processing method in which the IC card is used, with reference to FIG. 19.

FIG. 19 is a diagrammatic representation of the appearance of the IC card to be used for the ATM. As shown in FIG. 19, the IC card 400 is a card in which its main body 401 is embedded inside with a semiconductor memory 402 and a microprocessor 403. The main body 401 of the IC card is further provided with external connection pins 404 in order to serve as an interface with an external device, and it is connected through a card interface. It is also noted that a microcomputer with a memory may be used in place of the microprocessor.

Figure 20:
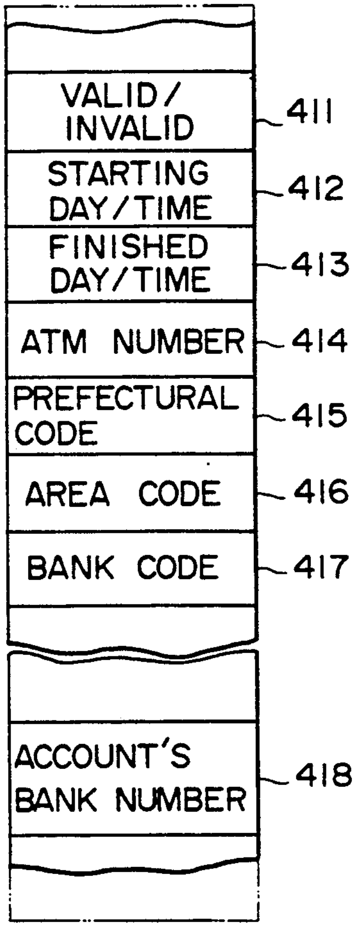
FIG. 20 is a diagrammatic representation showing an example of data format of advance transaction registration data or information recorded in the internal storage of the IC card.

FIG. 20 is a diagrammatic representation showing an example of a data format for advance transaction registration data or information registered in an internal storage of the IC card. As shown in FIG. 20, the advance transaction registration data or information recorded may contain, for example, a valid/invalid flag data 411 indicative of the validity or invalidity of the advance transaction, the scheduled starting day/time data 412 indicative of the scheduled starting day/time for the start of the advance transaction, the scheduled finished day/time data 413 indicative of the scheduled day/time for the finish of the advance transaction, the ATM number data 414 indicative of the identification of the ATM intended to be used for the advance transaction, the prefectural code data 415 indicative of the identification of the prefecture with the ATM installed therein so as to be intended for use in the advance transaction, the area code data 416 indicative of the district of the prefecture, in which the ATM intended to be used for the advance transaction is installed, the bank code data 417 indicative of the bank or banking organization running the ATM, and the account's bank number data 418 indicative of the bank or banking organization at which the account for the owner of the IC card is opened.

Figure 21:
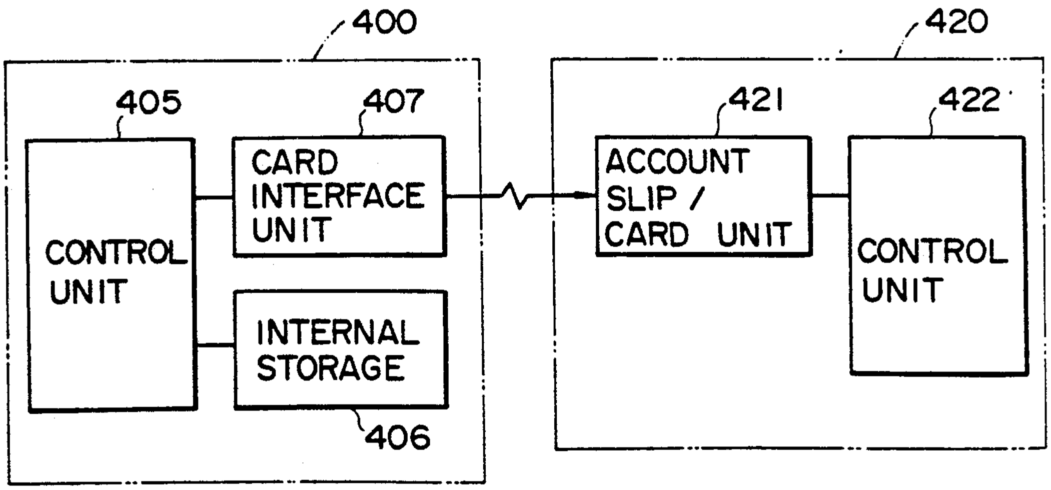
FIG. 21 is a block diagram showing a connection of the internal construction of the IC card to the element construction of the ATM which is used by the IC card.

FIG. 21 is a block diagram showing a connection relationship of the inner structure of the IC card with the essential structure of the ATM which the IC card takes advantage of. As shown in FIG. 21, reference numeral 400 denotes the IC card, reference numeral 405 denotes a control unit in the IC card, reference numeral 406 denotes the internal storage in the IC card, reference numeral 407 denotes a card interface section, reference numeral 420 denotes an ATM to be used with the IC card, reference numeral 421 denotes an account slip/card of the ATM, and reference numeral 422 denotes a control unit of the ATM.

As shown in FIG. 21, upon the insertion of the IC card 400 into a card input/output and itemized account slip outlet of the ATM 420, the account slip/card unit 421 of the ATM 420 is allowed to be connected to the card interface section 407 through the outer connecting pins 404 of the IC card 400 and a connecter (not shown), thereby enabling the write processing of the advance transaction registration data or information to be implemented to the internal storage 406 of the IC card and enabling the read processing of the advance transaction registration data or information to be implemented from the internal storage 406 thereof. This construction allows the execution of the advance transaction processing by using the IC card, in substantially the same manner as the magnetic card is used in the manner as described hereinabove.

Figure 22A:
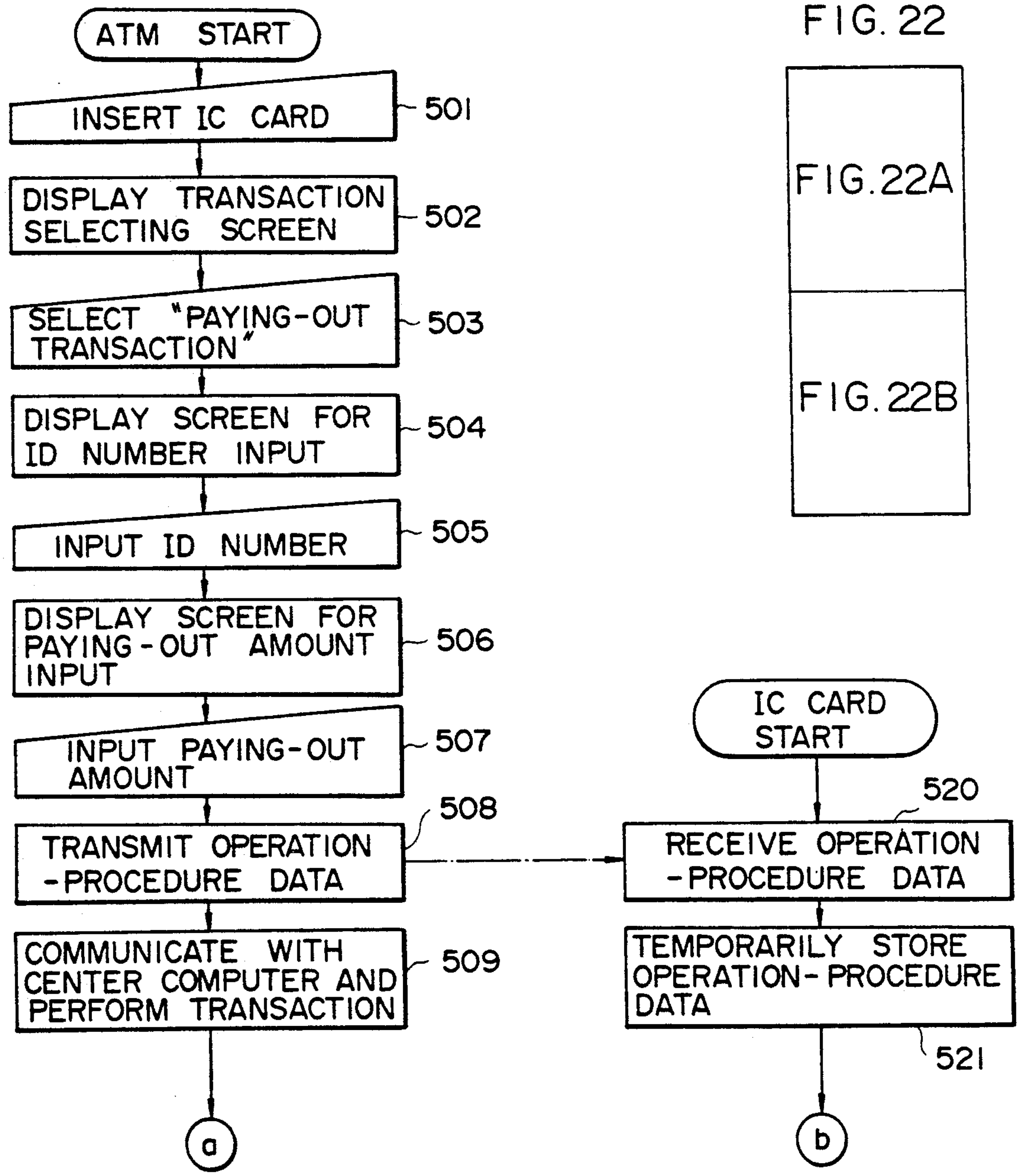
FIG. 22 (FIG. 22A and FIG. 22B) is a flow chart showing advance transaction registration processing for registering advance transaction registration data or information in advance in the IC card through the ATM.
Figure 22B:
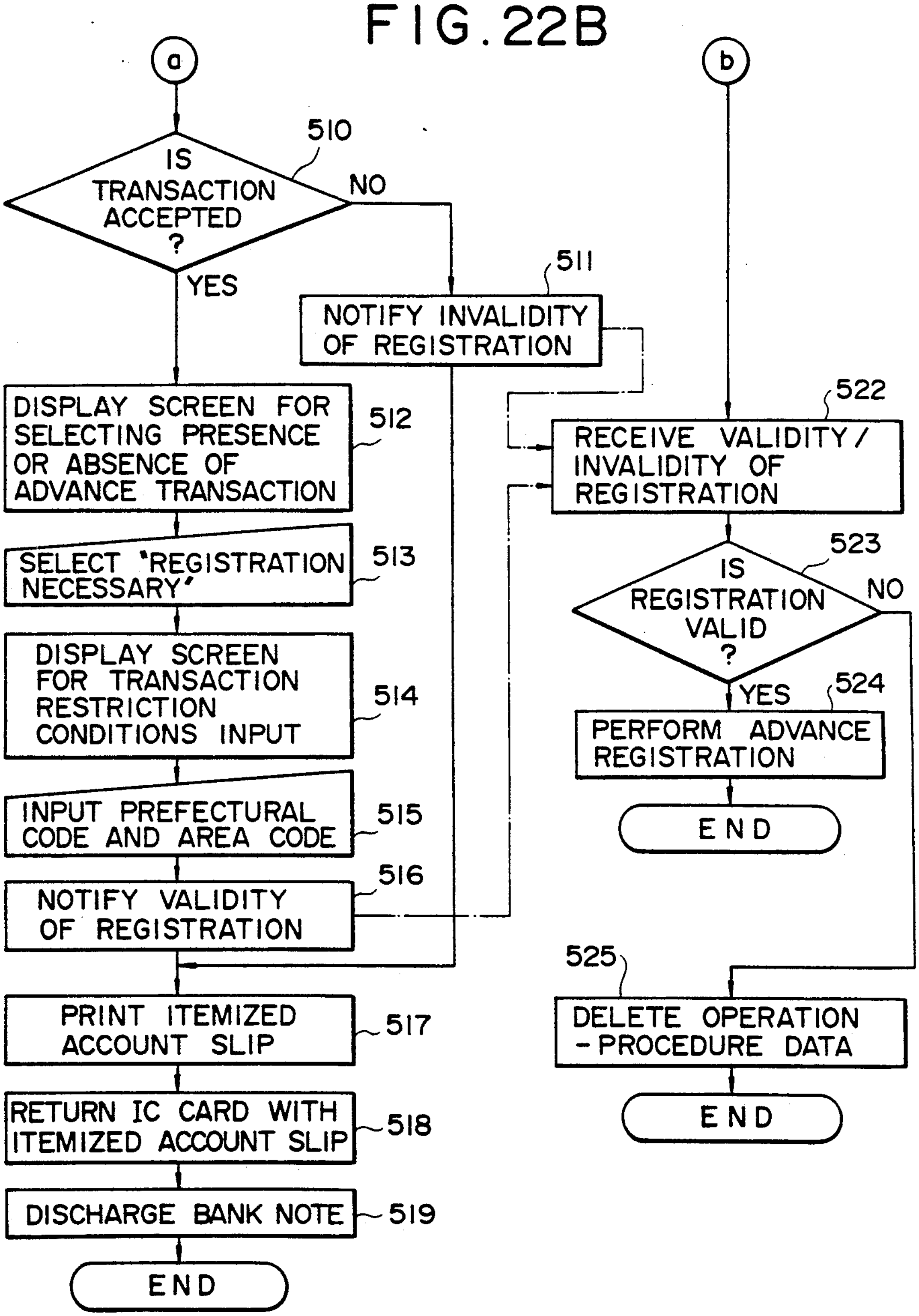
Figure 23:
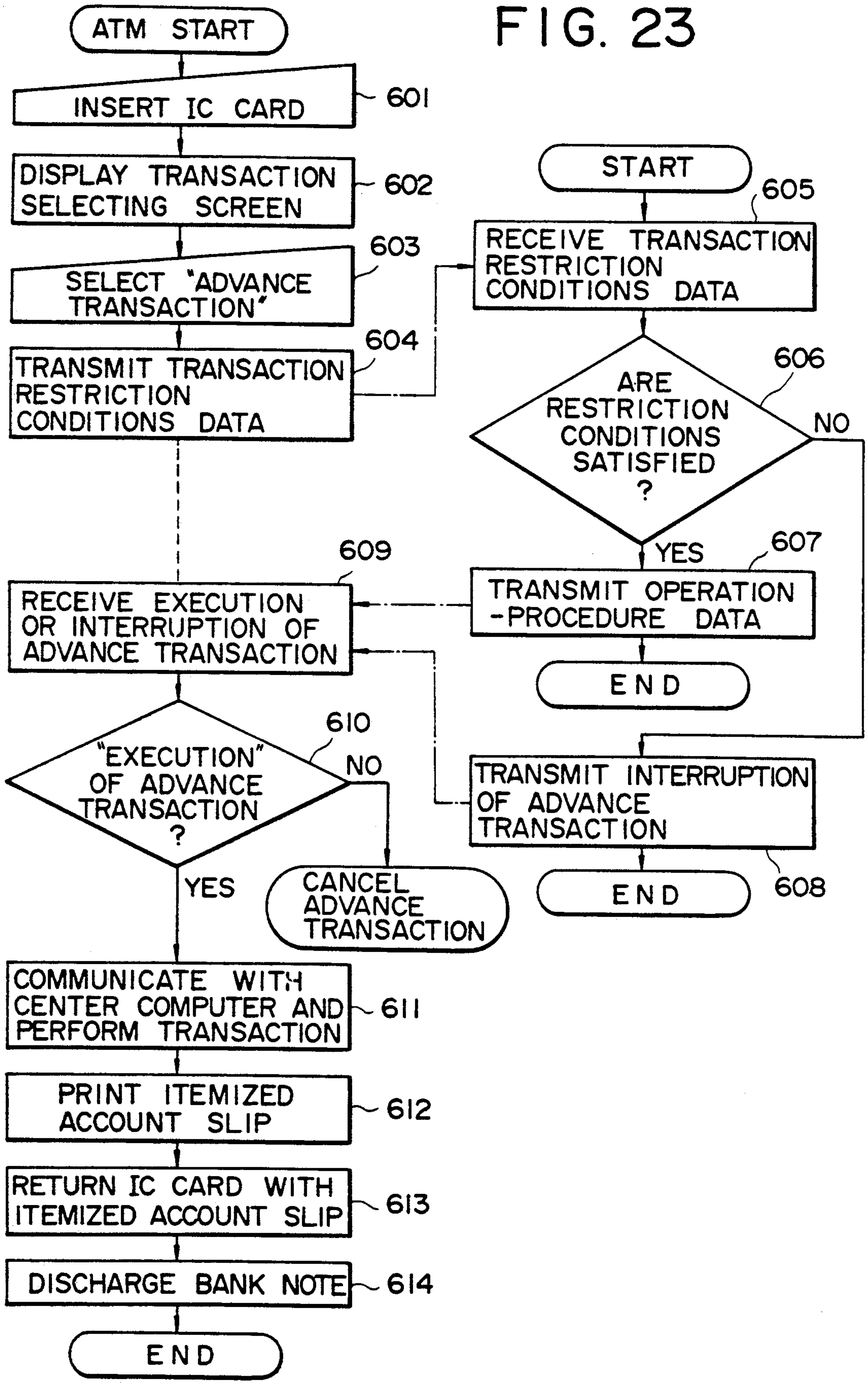
FIG. 23 is a flow chart showing the processing of transaction execution for executing payment transaction registered as advance transaction in the IC card by means of the registration processing of FIG. 22.

FIG. 22 is a flow chart showing the registration processing for the registration of the advance transaction by registering the advance transaction registration data or information in the IC card through the ATM. FIG. 23 is a flow chart showing the processing for the execution of the advance payment transaction registered by the registration processing of FIG. 22 so as to allow the advance transaction to be settled by the IC card.

First, the registration processing for the advance transaction will be described with reference to FIG. 22. The registration for the advance transaction is to register the transaction to be executed later as advance transaction under the same transaction conditions under which the transaction has so far been conducted immediately prior to the finish of the normal transaction using the ATM.

First, at step 501, the user inserts the card carried by the user into the IC card inlet/outlet and itemized account slip outlet in accordance with the operational guidance on the screen displayed on the touch input key and guidance display unit of the ATM. The insertion of the IC card into the ATM changes the display on the screen of the touch input key and guidance display unit to the transaction selecting screen at step 502, thereby requesting the user to selectively input the item of transaction sought to be settled by the user. Then, at step 503, the user selects the item of transaction and inputs "payment transaction" as advance transaction. Then, the display on the screen changes to a display for the input of the identification number of the user on the screen at step 504, followed by step 505 at which the user inputs the identification number. Thereafter, the display on the screen is changed to a display for the input of the payment amount requested to be transacted at step 506, followed by step 507 at which the user inputs the payment amount intended by the user to draw out. It is to be noted that the processing from step 503 to step 507 relates to normal transaction processing. Then, at step 508, the operation procedure data obtained by the operation of the processing up to step 507 is transmitted to the IC card.

At the part of the IC card, on the one hand, the operation-procedure data transmitted is received at step 520 and stored temporarily at step 521. In other words, the operation-procedure data obtained by a series of the operations as described hereinabove is transmitted from the control unit 422 of the ATM to the account slip/card unit 421 to which the control unit 422 of the ATM is connected, which in turn transmits the data to the control unit 405 of the IC card 400 through the card interface section 407 of the IC card. The control unit 405 of the IC card temporarily stores the operation-procedure data transmitted from the ATM in its internal storage 406.

At the part of the ATM, on the other hand, a communication is made with the central processing unit and the transaction processing is executed at step 509, in accordance with the operation-procedure data obtained by the operations at step 503, step 505 and step 507. As a result of the transaction processing, a decision is made to determine at step 510 if the transaction is accepted. If the result of decision at step 510 indicates that the transaction is to be accepted, the display on the screen is changed to a display for the input of the necessity or unnecessity of advance transaction on the screen at step 512. When the user intends to settle the requested transaction as advance transaction and selects "necessity of advance transaction" from the screen display at step 513, the display on the screen is changed to a display for a request for the input of a transaction restriction condition on the screen at step 514, followed by step 515 at which the user inputs the prefectural code/area code for the advance transaction as the transaction restriction condition. Then, at step 516, the prefectural code/area code are added and a message stating the validity of the advance registration is transmitted to the IC card from the ATM through the account slip/card unit 421 and the card interface unit 407.

If the result of decision at step 510 indicates that the requested transaction is unaccepted after the transaction processing at step 509, the operational procedure obtained so far by the input operation is rendered invalid so that a message is transmitted at step 511 to the effect that the registration is invalid, in order to inhibit the registration processing for the advance transaction.

When the IC card receives the message from the ATM to the effect that the registration is valid or invalid at step 522 and, when it is decided at step 523 that the registration is valid, the advance transaction registration data or information is subjected to advance registration so as to correspond to the operation procedure data temporarily stored in the internal storage of the IC card and the prefectural code/area code as the transaction restriction condition at step 524. If the result of decision at step 523 indicates that the registration is invalid, the operation-procedure data temporarily stored is erased at step 525, thereby finishing the processing of the advance registration at the part of the IC card.

Thereafter, following the normal payment transaction, the content or particulars of the transaction is printed on an itemized account slip at step 517, and the itemized account slip is delivered to the user, together with the IC card inserted into the ATM at step 518. Finally, the bank notes equivalent of the payment amount requested to be transacted are paid out to the user of the IC card at step 519, thereby finishing a series of the transaction.

Description will now be made with reference to FIG. 23 on the processing for executing the payment transaction using the IC card after the advance registration of the transaction has been carried out on the IC card in the manner as described hereinabove.

Referring to FIG. 23, at step 601, the user inserts the IC card with the advance registration made thereon into the card inlet/outlet and itemized account slip outlet in accordance with the operational guidance displayed on the screen of the touch input key and guidance display unit of the ATM. Upon insertion of the IC card into the ATM, the display on the screen of the touch input key and guidance display unit is changed to a display for a transactions selecting screen at step 602, thereby requesting the user for the input of the transaction the user requests to be settled. Then, at step 603, the user selects the item of transaction the user requests from the transactions selecting screen and inputs "payment transaction". Upon the input of the item of "payment transaction", the program flow goes to step 604 at which the ATM transmits to the IC card the identification data for identifying the ATM, stored in the internal storage, as the transaction restriction condition, i.e., the ATM number 97*a*, the bank code 97*b*, the prefectural code 97*c*, and the area code 97*d*. Upon transmission of the identification data to the IC card from the ATM, the IC card receives the transaction restriction condition data at step 605, followed by step 606 at which a decision is made to determine if the transaction restriction condition data received is compared with the transaction restriction condition registered in the internal storage of the IC card. If the result of decision at step 606 indicates that the former is not identical to the latter, the execution of the advance transaction is judged as unable and a message is transmitted to the ATM at step 608 to the effect that the advance transaction be interrupted. On the other hand, when the result of decision at step 606 indicates that the former is identical to the latter, the program flow proceeds to step 607 at which the advance transaction is judged as enabling and a message is transmitted to the ATM to the effect that the advance transaction be executed, together with the operation-procedure data stored in the internal storage 406.

Upon the transmission of the message and the operation-procedure data to the ATM from the IC card, the ATM receives the message to the effect that the advance transaction be executed or interrupted at step 609, and a decision is made at step 610 to determine if the content of the message is to the effect that the advance transaction be executed. If the result of decision at step 610 indicates that no advance transaction be executed, on the one hand, the program flow goes to a processing routine for deleting the advance transaction. When it is decided at step 610 that the advance transaction be executed, on the other hand, the program flow goes to step 611 at which a communication is made with the central processing unit and the transaction processing is implemented in accordance with the operation-procedure data. Thereafter, at step 612, the particulars of the transaction are printed out on an itemized account slip and, at step 613, the printed account slip and the IC card are returned to the user. Finally, the bank notes equivalent of the payment amount requested to be transacted are discharged and delivered to the user at step 614, thereby completing the execution of a series of the advance transaction.

In the processing for the execution of the advance transaction, the advance transaction data or information registered in the IC card is not deleted at the time of finish of the advance transaction, thereby enabling a repetition of the advance transaction to be conducted under the same transaction conditions. This method for the execution of the advance transaction is particularly efficient in executing the advance payment transaction on a regular basis by registering the content of the advance transaction on the IC card in advance prior to the return of the IC card to the user. The advance transaction registration data or information may be erased as needed.

As described hereinabove in the embodiment, storing the advance transaction registration data or information in the IC card enables the user to conduct the transaction only by inserting the IC card into the ATM.

The foregoing description is directed to specific embodiments relating to the present invention by way of examples, and it is to be understood that the present invention is not restricted in any respect to the specific examples as described hereinabove, and it is construed as encompassing any modifications, variations and changes within the spirit and scope of the present invention.

As described hereinabove, the advance transaction processing method according to the present invention permits normal transaction settled through an automatic teller machine to be registered as advance transaction, which is to be conducted next, on a card of the user as it is kept inserted into the automatic teller machine, an internal storage of the automatic teller machine or a central processing unit to which the automatic teller machine by setting a transaction restriction condition for the advance transaction. And, subsequent to the registration of the advance transaction, the automatic teller machine can execute the transaction procedure registered, when the transaction restriction condition for the advance transaction would be satisfied, only by the user inserting the registered card into the automatic teller machine, so that later advance transactions can be executed without any additional operation of the keys by the user of the card on a screen of the automatic teller machine, except for the insertion of the card thereinto by the user.

What is claimed is:

1. An advance transaction processing method in a transaction processing system for conducting transaction by inserting a card as a recording medium into an automatic teller machine by a user and carrying out input operation by the user, comprising:

- registering transaction assigning data for assigning transaction operation to be conducted by the user, a transaction restriction condition, and card identifying data on the card carried by the user:
- allowing an internal storage of the automatic teller machine to store a transaction-operational procedure by using the transaction assigning data as a key for search;
- confirming as to whether the transaction restriction condition is satisfied, when the card is inserted into the automatic teller machine;
- reading the transaction-operational procedure by using the transaction assigning data recorded on the card as the key for search; and
- allowing the automatic teller machine to execute the processing for the transaction in accordance with the transaction-operational procedure.

2. An advance transaction processing method as claimed in claim 1, wherein the transaction restriction condition for the advance transaction is confirmed by checking whether data on at least one of a scheduled day/time of the transaction to be conducted, a local area in which the automatic teller machine to be used for the advance transaction is installed, and a bank or banking organization at which the automatic teller machine to be used for the advance transaction is installed is identical.

3. A process for registering an advance transaction in an advance transaction processing method as claimed in claim 1, for subjecting the transaction intended to be conducted later to advance transaction, comprising:

- recording transaction-operational data for a normal transaction operation to be implemented by inserting a card carried by a user into an automatic teller .machine temporarily on an internal storage of the automatic teller machine as advance registration data;
- allowing the user to select as to whether to conduct the transaction operation so far conducted again at the time of advance transaction which follows later, immediately prior to completion of normal transaction;
- inputting a transaction restriction condition for the advance transaction when the user has selected so as to implement the transaction, which is to be conducted later, on the basis of the advance transaction;
- registering transaction assigning data in a combination of the advance registration data for the transaction-operational procedure temporarily recorded with the transaction restriction condition as key data in the storage of a central processing unit connected to the automatic teller machine;
- recording the transaction assigning data and the transaction restriction condition inputted in advance on the card inserted into the automatic teller machine; and
- returning the card to the user.

4. An advance transaction processing method as claimed in claim 1, for processing the transaction automatically without inputting the transaction operation by the user subsequent to insertion of the card into the automatic teller machine, said method comprising:

- reading the transaction restriction condition recorded on the card on which the advance transaction in turn is registered;
- confirming as to whether the transaction restriction condition is satisfied;
- reading the transaction assigning data recorded on the card when the transaction restriction condition is satisfied;
- searching reserved registration data registered in the internal storage of the automatic teller machine from a key data by using the transaction assigning data as the key data for search; and
- executing the transaction with the automatic teller machine in accordance with the transaction-operational data contained in the reserved registration data.

5. A process for registering an advance transaction as claimed in claim 3, for executing the advance transaction to be handled on a regular basis in a package with the automatic teller machine, wherein:

the transaction assigning data constituting the key data for search of the reserved registration data to be recorded on the card as the recording medium and the transaction restriction condition are recorded in a package by the bank or banking organization running the automatic teller machine;

the card as the recording medium is distributed to each user; and the internal storage of the automatic teller machine is regularly registered with corresponding reserved registration data in a package.

6. An advance transaction processing method as claimed in claim 4, wherein:

the card as the recording medium is an IC card having at least a processing unit and a storage disposed therein;

the reserved registration data and the transaction restriction condition are registered only in the storage of the IC card; and whether the transaction restriction condition is satisfied at the time of executing the advance transaction is confirmed by the processing unit of the IC card.

7. An advance transaction processing method in a transaction processing system for conducting by inserting a card as a recording medium carried by a user into an automatic teller machine to which a central processing unit is connected and implementing input operation by the user, comprising:

registering transaction assigning data for assigning transaction operation to be conducted by the user, a transaction restriction condition, and card identifying data on the card carried by the user;

allowing a storage of a central processing unit to which the automatic teller machine is connected, to store a transaction-operational procedure by using the transaction assigning data as a key for search;

confirming as to whether the transaction restriction condition is satisfied, when the card is inserted into the automatic teller machine;

reading the transaction-operational procedure by using the transaction assigning data recorded on the card as the key for search; and allowing the automatic teller machine to execute the processing for the transaction in accordance with the transaction-operational procedure.

8. An advance transaction processing method as claimed in claim 7, wherein the transaction restriction condition for the advance transaction is confirmed by checking whether data on at least one of a scheduled day/time of the transaction to be conducted, a local area in which the automatic teller machine to be used for the advance transaction is installed, and a bank or banking organization at which the automatic teller machine to be used for the advance transaction is installed is identical.

9. A process for registering an advance transaction intended to be conducted later in an advance transaction processing method as claimed in claim 7, for subjecting the transaction intended to be conducted later to advance registration, comprising:

transaction-operational data for a normal transaction operation to be implemented by inserting a card carried by a user into an automatic teller machine being temporarily recorded on a storage of a central processing unit to which the automatic teller machine is connected as advance registration data;

allowing the user to select as to whether to conduct the transaction operation so far conducted again at the time of advance transaction to be implemented later, immediately prior to completion of normal transaction;

inputting a transaction restriction condition for the advance transaction when the user has selected so as to implement the transaction, which is to be conducted later, on the basis of the advance transaction;

registering transaction assigning data in a combination of the advance registration data for the transaction-operational procedure temporarily recorded with the transaction restriction condition as key data in the storage of a central processing unit connected to the automatic teller machine;

recording the transaction assigning data and the transaction restriction condition inputted in advance on the card inserted into the automatic teller machine; and returning the card to the user.

10. An advance transaction processing method as claimed in claim 7, for processing the transaction automatically without inputting the transaction operation by the user subsequent to insertion of the card into the automatic teller machine, comprising:

reading the transaction restriction condition recorded on the card no which the advance transaction in turn is registered;

confirming as to whether the transaction restriction condition is satisfied;

reading the transaction assigning data recorded on the card when the transaction restriction condition is satisfied;

searching reserved registration data registered in the storage of the central processing unit to which the automatic teller machine is connected from a key data by using the transaction assigning data as the key data for search; and executing the transaction with the automatic teller machine in accordance with the transaction-operational data contained in the reserved registration data.

11. A process for registering an advance transaction as claimed in claim 9, wherein the bank or banking organization at which the advance transaction is implemented is assigned as the transaction restriction condition for the advance transaction.

12. A process for registering an advance transaction as claimed in claim 9, wherein a particular automatic teller machine at the bank or banking organization at which the advance transaction is implemented is assigned as the transaction restriction condition for the advance transaction.

13. A process for registering an advance transaction as claimed in claim 9, wherein a prefecture and an area having the bank or banking organization at which the advance transaction is implemented is assigned as the transaction restriction condition for the advance transaction.

14. A process for registering an advance transaction as claimed in claim 9, for executing the advance transaction to e handled on a regular basis in a package with the automatic teller machine, wherein:

the transaction assigning data constituting the key data for search of the reserved registration data to be recorded on the card as the recording medium and the transaction restriction condition are recorded in a package by the bank or banking organization running the automatic teller machine;

the card as the recording medium is distributed to each user; and the internal storage of the automatic teller machine is regularly registered with corresponding reserved registration data in a package.

15. An advance transaction processing method as claimed in claim 10, wherein:

the card as the recording medium is an IC card having least a processing unit and a storage disposed therein;

the reserved registration data and the transaction restriction condition are registered only in the storage of the IC card; and whether the transaction restriction condition is satisfied at the time of executing the advance transaction is confirmed by the processing unit of the IC card.

* * * * *